United States Patent
Horn et al.

(10) Patent No.: US 10,095,200 B2
(45) Date of Patent: Oct. 9, 2018

(54) SYSTEM AND METHOD FOR IMPROVING PERFORMANCE OF A CHEMICAL PLANT WITH A FURNACE

(71) Applicant: UOP LLC, Des Plaines, IL (US)

(72) Inventors: Ian G. Horn, Streamwood, IL (US); Christophe Romatier, Wilmette, IL (US); Paul Kowalczyk, Hoffman Estates, IL (US); Zak Alzein, Burr Ridge, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/665,042

(22) Filed: Jul. 31, 2017

(65) Prior Publication Data

US 2018/0046155 A1    Feb. 15, 2018

Related U.S. Application Data

(63) Continuation-in-part of application No. 15/084,237, filed on Mar. 29, 2016.
(Continued)

(51) Int. Cl.
    *G05B 13/04* (2006.01)
    *C10G 35/04* (2006.01)

(52) U.S. Cl.
    CPC ........... *G05B 13/048* (2013.01); *C10G 35/04* (2013.01); *Y02P 90/18* (2015.11); *Y02P 90/26* (2015.11)

(58) Field of Classification Search
    None
    See application file for complete search history.

(56) References Cited

U.S. PATENT DOCUMENTS

| 6,795,798 B2 | 9/2004 | Eryurek et al. |
| 7,067,333 B1* | 6/2006 | Pasadyn ............... G05B 17/02 257/48 |

(Continued)

FOREIGN PATENT DOCUMENTS

WO    2009046095 A1    4/2009

OTHER PUBLICATIONS

Sep. 22, 2017—U.S. Non-Final Office Action—U.S. Appl. No. 15/658,174.
(Continued)

*Primary Examiner* — Mohammad Ali
*Assistant Examiner* — Bernard G Lindsay
(74) *Attorney, Agent, or Firm* — Banner & Witcoff, Ltd.

(57) ABSTRACT

A refinery or petrochemical plant may include a fractionation column and related equipment, such as one or more condensers, receivers, reboilers, feed exchangers, and pumps. The equipment may have boundaries or thresholds of operating parameters based on existing limits and/or operating conditions. Illustrative existing limits may include mechanical pressures, temperature limits, hydraulic pressure limits, and operating lives of various components. There may also be relationships between operational parameters related to particular processes. For example, the boundaries on a naphtha reforming reactor inlet temperature may be dependent on a regenerator capacity and hydrogen-to-hydrocarbon ratio, which in turn may be dependent on a recycle compressor capacity. Operational parameters of a final product may be determined based on actual current or historical operation, and implemented in one or more models to determine adjustments for enhanced operational efficiency.

20 Claims, 7 Drawing Sheets

Related U.S. Application Data

(60) Provisional application No. 62/140,029, filed on Mar. 30, 2015.

(56) References Cited

U.S. PATENT DOCUMENTS

| | | | |
|---|---|---|---|
| 7,133,807 | B2 | 11/2006 | Karasawa |
| 7,151,966 | B1 | 12/2006 | Baier et al. |
| 8,204,717 | B2 | 6/2012 | McLaughlin et al. |
| 2002/0123864 | A1* | 9/2002 | Eryurek ............ G05B 23/0254 702/188 |
| 2002/0179495 | A1* | 12/2002 | Heyse ................... C10G 35/04 208/137 |
| 2003/0147351 | A1 | 8/2003 | Greenlee |
| 2004/0220778 | A1 | 11/2004 | Imai et al. |
| 2006/0133412 | A1 | 6/2006 | Callaghan |
| 2007/0059838 | A1* | 3/2007 | Morrison ............... F25J 3/0219 436/55 |
| 2007/0250292 | A1 | 10/2007 | Alagappan et al. |
| 2008/0086322 | A1 | 4/2008 | Wallace |
| 2011/0311014 | A1 | 12/2011 | Hottovy et al. |
| 2012/0083933 | A1 | 4/2012 | Subbu et al. |
| 2012/0095808 | A1 | 4/2012 | Kattapuram et al. |
| 2013/0270157 | A1 | 10/2013 | Ferrara |
| 2013/0311437 | A1 | 11/2013 | Stluka et al. |
| 2015/0077263 | A1 | 3/2015 | Ali et al. |
| 2015/0185716 | A1* | 7/2015 | Wichmann ............ F01K 23/101 700/287 |
| 2015/0276208 | A1 | 10/2015 | Maturana et al. |
| 2016/0033941 | A1 | 2/2016 | T et al. |
| 2016/0098037 | A1 | 4/2016 | Zornio et al. |
| 2016/0147204 | A1 | 5/2016 | Wichmann et al. |

OTHER PUBLICATIONS

Dec. 14, 2017—(WO) International Search Report—App PCT/US2017/051954.

Jan. 26, 2018—U.S. Non-Final Office Action—U.S. Appl. No. 15/640,120.

Jun. 6, 2018—U.S. Final Office Action—U.S. Appl. No. 15/640,120.

* cited by examiner

SYSTEM AND METHOD FOR IMPROVING PERFORMANCE OF A CHEMICAL PLANT WITH A FURNACE

CROSS-REFERENCE

This application is a continuation-in-part of U.S. patent application Ser. No. 15/084,237, filed Mar. 29, 2016, which claims priority under 35 U.S.C. § 119(e) of U.S. Provisional Patent Application No. 62/140,029, filed Mar. 30, 2015, each of which is incorporated herein by reference in its entirety.

FIELD

The present disclosure is related to improving operating processes of a plant, such as a chemical plant or refinery. Specifically, refinery operations may be optimized to, for example, result in improved yields, chemical product properties, and/or coke production rates by tuning process models for threshold analysis and implementing resulting recommendations in operations.

BACKGROUND

Companies operating refineries and petrochemical plants typically face tough challenges in today's environment. These challenges may include increasingly complex technologies, a reduction in workforce experience levels, and constantly changing environmental regulations.

Furthermore, companies seek to continually increase production and efficiency of existing operations. In response, catalyst, adsorbent, equipment, and control system suppliers develop more complex systems that may increase performance. Maintenance and operations of these advanced systems generally requires increased skill levels that may be difficult to develop, maintain, and transfer, given the time pressures and limited resources of today's technical personnel. This means that these increasingly complex systems are not always operated at their highest potential. In addition, when existing assets are operated close to and beyond their design limits, reliability concerns and operational risks may increase.

Plant operators typically respond to these challenges with one or more strategies, such as, for example, availability risk reduction, working the value chain, and continuous optimization. Availability risk reduction generally places an emphasis on achieving adequate plant operations as opposed to maximizing performance. Working the value chain typically places an emphasis on improving the match of feed and product mix with operational capabilities and other demands. Continuous optimization often employs tools, systems, and models to continuously monitor and bridge gaps in plant performance.

There are multiple levels of gaps (or performance deficits) that refinery operators typically experience:

1) Events or "Lost Opportunities" Gap

Most refinery operators may sufficiently track the results of unplanned events in their refineries: unplanned shutdowns, equipment availability problems, or the like. The impact associated with these gaps may be large, but the duration is normally short. Well-operated refineries may keep these events to a minimum through effective process and mechanical reliability programs.

2) Backcasting Gap

Some refineries focus on a backcasting (historical) gap in which the operator compares the monthly refinery production plan against the actual achieved operations, and conducts an analysis to understand and resolve the cause(s) for any gap(s). This is typically done on a monthly basis. Refinery operators may often uncover substantial improvement if they resolve the root causes for deviation from refinery production process plans.

But when root causes are embedded in poor process performance, they are often difficult to identify. This historical backcasting analysis also may be costly, in that it leaves issues unidentified and un-resolved until the end of the month. Early identification of this gap and resolution of the problems may avoid significant losses. It is important to maintain continuous and consistent levels of desired performance when optimizing a particular process based on various plant process models to ensure consistent and viable results.

Therefore, there is a need for an improved, automated tuning system that utilizes a strategy of optimization that employs tools, systems, and models to enable operators to monitor and successfully bridge the gaps in plant performance.

SUMMARY

A general object of the disclosure is to improve operational efficiency of chemical plants and refineries. A more specific object of this disclosure is to overcome one or more of the problems described herein. A general object of this disclosure may be attained, at least in part, through a method for improving operation of a plant. The method includes obtaining plant operation information from the plant.

The present disclosure further comprehends a method for improving operation of a plant that includes obtaining plant operation information from the plant and generating a plant process model using the plant operation information. The disclosure further comprehends a method for improving operation of a plant. The method may include receiving plant operation information over a network and generating a plant process model using the plant operation information.

A simulation engine may be systematically tuned to provide a sound basis for plant optimization. Key matching parameters may be defined and reconciled based on associated reference points, and differences of one or more parameters may be iteratively or cumulatively assessed to determine a fitness of the simulation compared to actual plant operations. As described in greater detail below, a threshold value may be defined and determined to assess the need for additional tuning of the simulation engine based on the fitness of the simulation.

The present disclosure may utilize configured process models to monitor, predict, and/or optimize performance of individual process units, operating blocks and/or complete processing systems. Routine and frequent analysis of predicted versus actual performance may allow early identification of operational discrepancies that may be acted upon to optimize impact.

The present disclosure may utilize process measurements, such as, for example, measurements from pressure sensors, differential pressure sensors, orifice plates, venturi, other flow sensors, temperature sensors (e.g., thermocouples, temperature probes, thermal cameras, infrared cameras), capacitance sensors, weight sensors, gas chromatographs, moisture sensors, and/or other sensors commonly found in the refining and petrochemical industry. Further, the process may utilize laboratory measurements from, for example, gas chromatographs, liquid chromatographs, distillation measurements, octane measurements, and/or other laboratory measurements commonly found in the refining and petrochemical industry.

The process may be are used to monitor the performance of equipment, such as pumps, compressors, heat exchangers, fired heaters, control valves, fractionation columns, reactors and/or other process equipment commonly found in the refining and petrochemical industry.

The method may be implemented using a web-based computer system. The benefits of executing work processes within a web-based platform may include improved plant performance due to an increased ability by operations to identify and capture opportunities, a sustained ability to bridge performance gaps, an increased ability to leverage personnel expertise, and/or improved enterprise tuning. Advanced computing technology, in combination with other parameters, may thus be used to change the way plants, such as refineries and petrochemical facilities, are operated.

The present disclosure may use a data collection system at a plant to capture data that may be automatically sent to a remote location, where it may be reviewed to, for example, eliminate errors and biases, and/or used to calculate and report performance results. The performance of the plant and/or individual process units of the plant may be compared to the performance predicted by one or more process models to identify any operating differences, or gaps.

A report (e.g., a daily report) showing actual performance compared to predicted performance may be generated and delivered to a plant operator and/or a plant or third party process engineer via one or more computer networks (e.g., the internet). The identified performance gaps may allow the operators and/or engineers to identify and resolve the cause of the gaps. The method may further use the process models and plant operation information to run optimization routines that converge on an optimal plant operation for given values.

The method may provide plant operators and/or engineers with regular advice that may enable recommendations to adjust setpoints or reference points, which may allow the plant to run continuously at or closer to optimal conditions. The method may provide the operator alternatives for improving or modifying the future operations of the plant. The method may regularly or periodically maintain and tune the process models to correctly represent the true potential performance of the plant. In some embodiments, the method may include optimization routines configured per the operator's specific criteria, which may be used to identify optimum operating points, evaluate alternative operations, and/or evaluate feed.

The present disclosure provides a repeatable method that may help refiners bridge the gap between actual and achievable performance. The method may utilize process development history, modeling and stream characterization, and/or plant automation experience to address the critical issues of ensuring data security as well as efficient aggregation, tuning, and/or movement of large amounts of data. Web-based optimization may enable achieving and sustaining maximum process performance by connecting, on a virtual basis, technical expertise and the plant process operations staff.

The enhanced workflow may utilize configured process models to monitor, predict, and/or optimize performance of individual process units, operating blocks, or complete processing systems. Routine and frequent analysis of predicted versus actual performance may allow early identification of operational discrepancies, which may be acted upon to optimize impact.

As used herein, references to a "routine" are to be understood to refer to a sequence or sequences of computer programs or instructions for performing a particular task. References herein to a "plant" are to be understood to refer to any of various types of chemical and petrochemical manufacturing or refining facilities. References herein to a plant "operators" are to be understood to refer to and/or include, without limitation, plant planners, managers, engineers, technicians, and others interested in, overseeing, and/or running the daily operations at a plant.

In some embodiments, a tuning system may be provided for improving operation of a plant. One or more servers may be coupled to the tuning system for communicating with the plant via a communication network. A computer system may include a web-based platform for receiving and sending plant data related to the operation of the plant over the network. A display device may interactively display the plant data. A reconciliation unit may be configured for reconciling actual measured data from the plant in comparison with a performance process model result from a simulation engine based on a set of predetermined reference or set points. The reconciliation unit may perform a heuristic analysis against the actual measured data and the performance process model result using a set of predetermined threshold values.

In some embodiments, a tuning method may be provided for improving operation of a plant, and may include providing one or more servers coupled to a tuning system for communicating with the plant via a communication network; providing a computer system having a web-based platform for receiving and sending plant data related to the operation of the plant over the network; providing a display device for interactively displaying the plant data, the display device being configured for graphically or textually receiving the plant data; obtaining the plant data from the plant over the network; generating a plant process model based on the plant data for estimating plant performance expected based on the plant data; monitoring a health of the plant based on the plant process model; reconciling actual measured data from the plant in comparison with a performance process model result from a simulation engine based on a set of predetermined reference or set points; creating a scoring model for determining a degree of trustworthiness of the plant process model based on the plant data; and tuning the plant process model based on the scoring model for representing a potential performance of the plant.

The foregoing and other aspects and features of the present disclosure will become apparent to those of reasonable skill in the art from the following detailed description, as considered in conjunction with the accompanying drawings.

DETAILED DESCRIPTION

Figure 1:
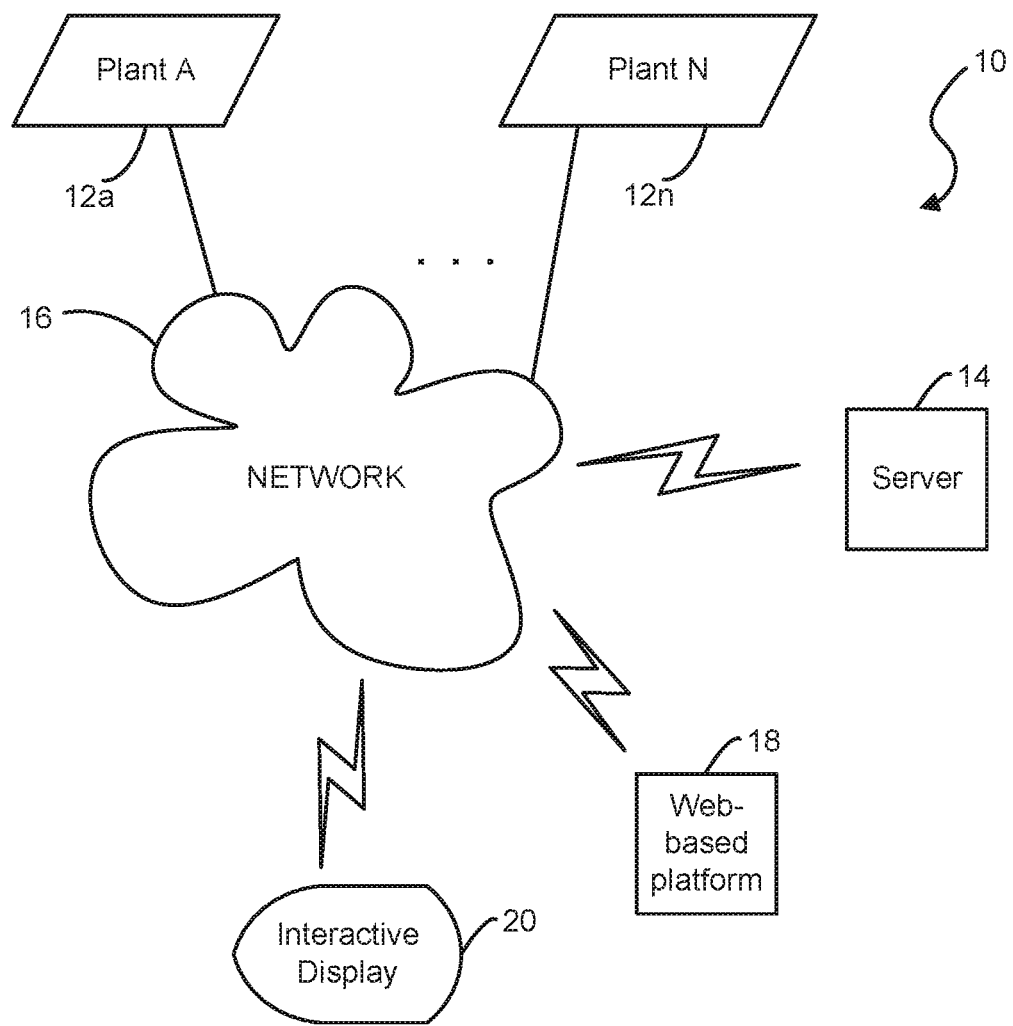
FIG. 1 depicts an illustrative use of a tuning system in a cloud computing infrastructure in accordance with one or more embodiments of the present disclosure.

Referring now to FIG. 1, an illustrative tuning system, generally designated 10, using an embodiment of the present disclosure may be provided for improving operation of one or more plants (e.g., Plant A . . . Plant N) 12a-12n, such as a chemical plant or refinery, or a portion thereof. The present tuning system 10 uses plant operation information obtained from at least one plant 12a-12n.

As used herein, the term "system," "unit" or "module" may refer to, be part of, or include an Application Specific Integrated Circuit (ASIC), an electronic circuit, memory (shared, dedicated, or group) and/or a processor (shared, dedicated, or group) that executes computer-readable instructions (e.g., software or firmware programs), a combinational logic circuit, and/or other suitable components that provide the described functionality. The system, unit, or module may be stored on one or more non-transitory computer-readable media. Thus, while this disclosure includes particular examples and arrangements of the units, the scope of the present system should not be so limited, since other modifications will become apparent to the skilled practitioner.

The tuning system 10 may reside in or be coupled to one or more servers or computing devices 14 (including, e.g., database and video servers), and may be programmed to perform tasks and display relevant data for different functional units via a communication network 16, e.g., using a secured cloud computing infrastructure. Other suitable networks may be used, such as the internet, a wired network, a wireless network (e.g., Wi-Fi), a corporate Intranet, a local area network (LAN), a wide area network (WAN), and/or the like, using dial-in connections, cable modems, high-speed ISDN lines, and/or other types of communication methods known in the art. Some or all relevant information may be stored in one or more databases for retrieval by the tuning system 10 or the computing device 14 (e.g., as a data storage device and/or a non-transitory machine-readable data-storage medium carrying computer programs or instructions).

Further, the present tuning system 10 may be partially or fully automated. In some embodiments, the tuning system 10 may be performed by a computer system, such as a third-party computer system, local to or remote from the plant 12a-12n and/or the plant planning center. The present tuning system 10 may include a web-based platform 18 that obtains or receives and sends information over a communication network, such as the internet. Specifically, the tuning system 10 may receive signals and parameters from at least one of the plants 12a-12n via the communication network 16, and display, (e.g., in real time or substantially in real time), related performance information on an interactive display device 20 accessible to an operator or user.

Using a web-based system for implementing the method may provide benefits, such as improved plant performance due to an increased ability by plant operators to identify and capture opportunities, a sustained ability to bridge plant performance gaps, and/or an increased ability to leverage personnel expertise and improve training and development. The method may allow for automated daily or other regular evaluation of process performance, thereby increasing the frequency of performance review with less time and effort from plant operations staff.

The web-based platform 18 may allow one or more users to work with the same information, thereby creating a collaborative environment for sharing best practices or for troubleshooting. The method may provide more accurate prediction and optimization results due to fully configured models, which may include, for example, catalytic yield representations, constraints, degrees of freedom, and the like. Routine automated evaluation of plant planning and operation models may allow timely plant model tuning to reduce or eliminate gaps between plant models and the actual plant performance. Implementing the method using the web-based platform 18 may also allow for monitoring and updating multiple sites, thereby better enabling facility planners to propose realistic optimal targets.

Figure 2:
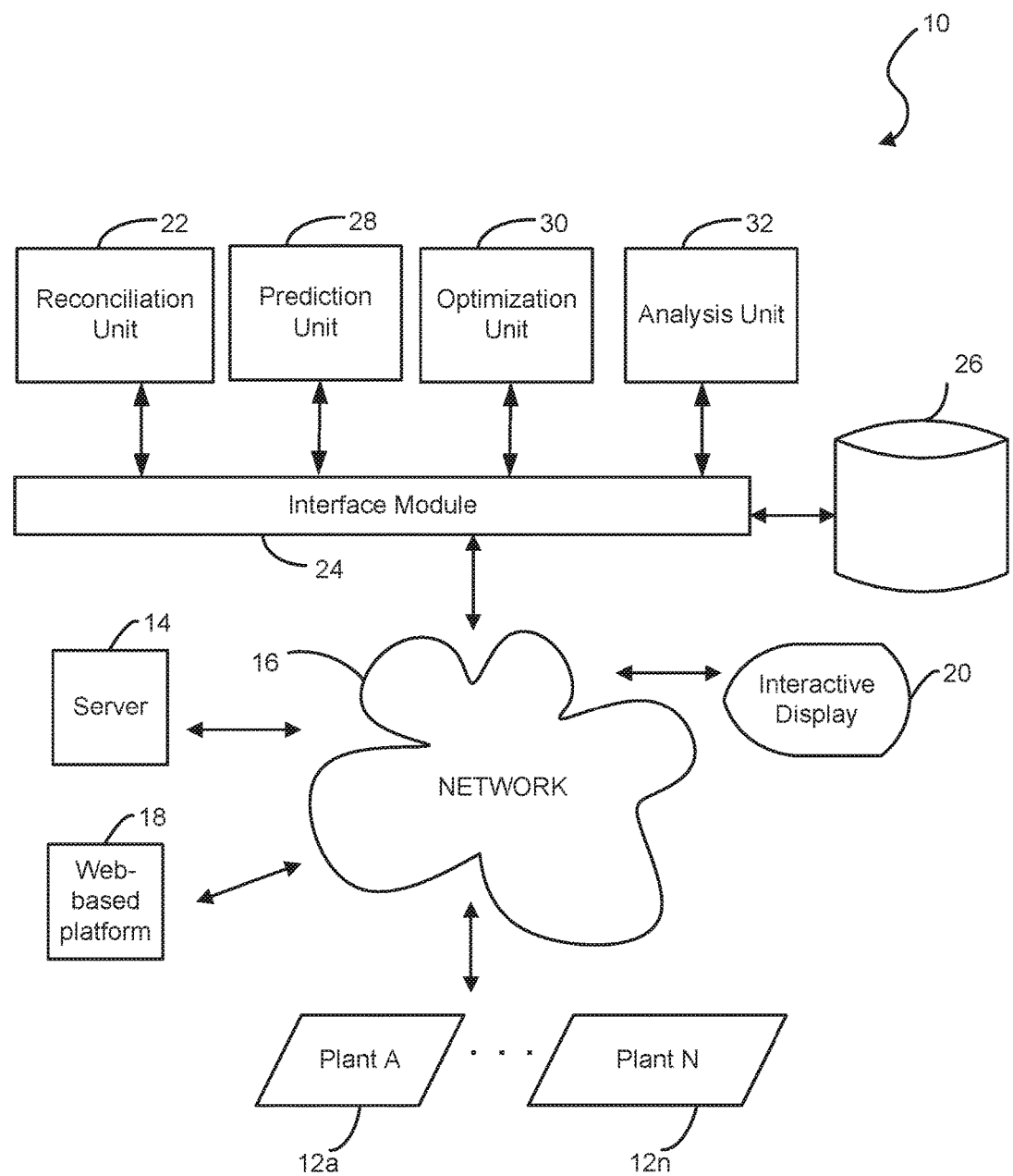
FIG. 2 depicts an illustrative functional block diagram of a tuning system featuring functional units in accordance with one or more embodiments of the present disclosure.

Referring now to FIG. 2, the present tuning system 10 may include a reconciliation unit 22 configured for reconciling actual measured data from the respective plants 12a-12n in comparison with performance process model results from a simulation engine based on a set of reference or set points. In some embodiments, a heuristic analysis may be performed against the actual measured data and the performance process model results using a set of predetermined threshold values. A statistical analysis and/or other suitable analytic techniques may be used to suit different applications.

As an example only, operating plant parameters or plant data, such as temperatures, pressure levels, feed compositions, fractionation column product compositions, and the like, may be received from the respective plants 12a-12n. These plant parameters may represent actual measured data from selected pieces of equipment in the plants 12a-12n during a predetermined time period. Comparisons of plant operational parameters may be performed with the performance process model results from the simulation engine based on the predetermined threshold values.

As an example of measuring operating plant parameters or plant data, temperature data may be sensed by various temperature sensors, including thermocouples, resistance temperature detectors (RTD), thermistors, and/or thermal imaging techniques. Temperature sensing devices may be directly connected to the target equipment (e.g., a knife-edge skin thermocouple), or may be sheathed in a protective device (e.g., a thermowell). The temperatures these devices measure may result in a variable voltage signal, a resistance, or may be transmitted as a video image. In one example, a knife-edge skin thermocouple directly welded to the heater tube may be used to generate a voltage signal, which may be interpreted by the control system in the plant as a specific temperature. This temperature data may be sent from the plant (12a-12n) to the system.

As another example of measuring operating plant parameters or plant data, pressures, differential pressures, some levels and/or some flows may be measured using pressure or differential pressure sensors. These sensors may use a capacitive and/or piezoresistive primary sensor to measure the force of the fluid and convert this signal to an electric signal that may be interpreted by the control system. In one example, the electric signal would be a 4-20 mA signal.

To measure flows, a primary device may be used to create a differential pressure that is proportional to the flow through the device. The differential pressure sensor may be connected to the inlet and outlet sides of the primary device to measure the differential pressure at specific locations in the flow profile. The primary device may be a restriction orifice, a venturi, and/or an averaging pitot device.

As another example of measuring operating plant parameters or plant data, compositions may be measured through a variety of analytical techniques. The analyzers used in these techniques may be dedicated instruments closely coupled to the process that analyze continuously or periodically, or they may be shared instruments in a remote laboratory, and may be operated on a regular or irregular schedule. Analytical techniques used to determine compositions may include using gas chromatographs, liquid chromatographs, infrared, nuclear magnetic resonance, and/or other techniques. Analyzers may be designed to measure the partial or entire contents of the sampled fluid, or may be designed to measure the quantity of one or more specific components.

The tuning system 10 may include an interface module 24 for providing an interface between the tuning system 10, one or more internal or external databases 26, and/or the network 16. The interface module 24 may receive data from, for example, plant sensors via the network 16, and other related system devices, services, and applications. The other devices, services, and applications may include, but are not limited to, one or more software or hardware components related to the respective plants 12a-12n. The interface module 24 may also receive the signals and/or parameters, which may be communicated to the respective units and modules, such as the tuning system 10, and associated computing modules or units.

A prediction unit 28 may be provided for predicting a trustworthiness of a current process model of the simulation engine based on the comparisons of the plant operational parameters. The prediction unit 28 may generate or calculate a trustworthiness score of the process model based on the comparisons using a partial least squares (PLS) analysis, an orthogonal PLS (OPLS) analysis, and/or other suitable analytic techniques, as known in the art.

For example, a scoring model may be created for determining a degree of trustworthiness of the current process model based on the plant operational parameters. Further, the trustworthiness score may be weighted based on an amount of difference between the plant operational parameters and the corresponding predetermined threshold values. The scoring model may be updated with the weighted trustworthiness scores, and the current process model may be adjusted or tuned based on the scoring model.

More specifically, at least one plant parameter or a subset of the plant parameters may be selected as a key matching parameter, and a difference between the selected plant parameter and the corresponding performance model result may be assessed cumulatively during a predetermined time period to determine the fitness of the simulation to the related actual plant operations. When the difference is greater than a predetermined threshold value, an additional tuning of the process model may be performed. For example, when an error margin of the difference is greater than a predetermined percentage (%) value, the current process model may be further evaluated and tuned accordingly.

An optimization unit 30 may be provided for optimizing at least a portion of the refining or petrochemical process of at least one plant 12a-12n based on the trustworthiness score of the performance or plant process model. It may be difficult for operators in the refining and petrochemical field to optimize at the level of an entire complex of the plant 12a-12n because there are various parameters and measurements that might not provide a cohesive basis for process simulation and optimization. In some embodiments, the trustworthiness score may be a sum of weighted differences between the measured values from the plant and the matching calculated values in the process model. The weighting factors may be dependent on the trustworthiness of the individual measurements. The weighting factors may be calculated based on various aspects of the measurements, which may, for example, include accuracy of the primary measuring sensor or age of the measurement.

In operation, the optimization unit 30 may receive the actual measured data from a customer site or plant 12a-12n on a recurring basis (e.g., every 100 milliseconds, every second, every ten seconds, every minute, every two minutes). Data cleansing may be performed. For example, the data may be analyzed for completeness and corrected for gross errors by the optimization unit 30. Then, the data may be corrected for measurement issues (e.g., an accuracy problem for establishing a simulation steady state) and overall mass balance closure to generate a duplicate set of reconciled plant data.

The corrected data may be used as an input to a simulation process, in which the process model may be tuned to ensure that the simulation process matches the reconciled plant data. An output of the reconciled plant data may be input into a tuned flowsheet, and then may be generated as a predicted data. Each flowsheet may be a collection of virtual process model objects as a unit of process design. A delta value, which is a difference between the reconciled data and the predicted data, may be validated to ensure that a viable optimization case is established for a simulation process run.

As a result, the tuned simulation engine may be used as a basis for the optimization case, which may be run with a set of the reconciled data as an input. The output from this step is a new set of data, namely an optimized data. A difference between the reconciled data and the optimized data may provide an indication as to how the operations should be changed to reach a greater efficiency. In this configuration, the optimization unit 30 may provide a user-configurable method for minimizing objective functions, thereby maximizing efficiency of the plants 12a-12n.

In some embodiments, the optimization unit 30 may define an objective function as a calculation of multiple operational factors for a particular process, such as materials consumed, products produced, and/or utilities utilized, subject to various constraints. For example, a maximum fractionation column capacity may be determined by a flooding limit of the internal components. In some embodiments, the maximum capacity of a fractionation column may be determined by estimating the liquid and vapor flow rates and properties (density, viscosity, surface tension) on one or more stages of a fractionation column. The optimization unit 30 may use the design of the fractionation column internal devices (tray size, number of holes, downcomer dimensions, weir heights) and/or the vapor and liquid flow rates and properties to calculate the fraction of the available column capacity that is currently being used. The maximum capacity is the capacity above which the efficiency of the column is drastically reduced and is commonly called "flooding." Flooding can manifest as excessive liquid flow or excessive vapor flow.

In another example, a maximum capacity of a furnace may be determined based on a surface temperature of a tube inside the furnace. The surface temperature may be measured by one or more temperature sensors, such as a thermocouple, temperature probe, thermal imaging camera, or the like. Specifically, in some embodiments, the maximum capacity of a furnace may be based on one or more indicators. The heater tubes may be designed for a maximum external temperature, above which the life of the tube may be in jeopardy and/or at risk of failure. The tube wall temperature may be related to the heat flow capacity of the heater (e.g., the higher the heat flow, the higher the tube wall temperature). The actual furnace tube wall temperature may be measured using one or more temperatures sensors. These sensors may be placed at specific places on the tube wall, and in some instances, might not always be accurate. In some embodiments, one or more alternative methods of estimating tube wall temperature may include calculating the heat flow of the heater and/or calculating, using the emissivity of the tubes and various geometrical factors, the estimated maximum tube wall temperature. In some embodiments, measured values may be used during the reconciliation process to determine the geometrical factors used in the estimated values.

Thus, the optimization unit 30 may use analytical calculations to modify parameters in the model that best fit the measured data from the plant. In some embodiments, this may include data reconciliation. For example, in some embodiments, the optimization unit 30 may correlate the surface temperatures that are calculated by the process calculations with measured temperatures that are measured from the plant. Through those correlations, the optimization unit 30 may tune the process calculations such that the process model better reflects what is actually happening in the plant. From that, the system may be better able to predict where the future limits of the equipment (e.g., fired heater) may be in future modes of operation. Other suitable objective functions may suit different applications.

The tuning system 10 may include an analysis unit 32 configured for determining an operating status of the refinery or petrochemical plant to ensure robust operation of the plant 12a-12n. The analysis unit 32 may determine the operating status based on at least one of a kinetic model, a parametric model, an analytical tool, related knowledge, and/or a best practice standard.

In some embodiments, the analysis unit 32 may receive historical or current performance data from one or more of the plants 12a-12n to proactively predict future actions to be performed. To proactively predict various limits of a particular process and stay within the acceptable range of limits, the analysis unit 32 may determine target operational parameters of a final product based on actual current and/or historical operational parameters, e.g., from a flow of steam, a heater, a temperature set point, a pressure signal, or the like.

For example, in using the kinetic model or other detailed calculations, the analysis unit 32 may establish boundaries or thresholds of operating parameters based on existing limits and/or operating conditions. Exemplary existing limits may include mechanical pressures, temperature limits, hydraulic pressure limits, and/or operating lives of various components. Other suitable limits and conditions may suit different applications.

In using the knowledge and best practice standard, based upon, for example, specific know-how, the analysis unit 32 establishes relationships between operational parameters related to the specific process. For example, the boundaries on a naphtha reforming reactor inlet temperature may be dependent on a regenerator capacity and hydrogen-to-hydrocarbon ratio, which is itself dependent on a recycle compressor capacity.

Figure 3:
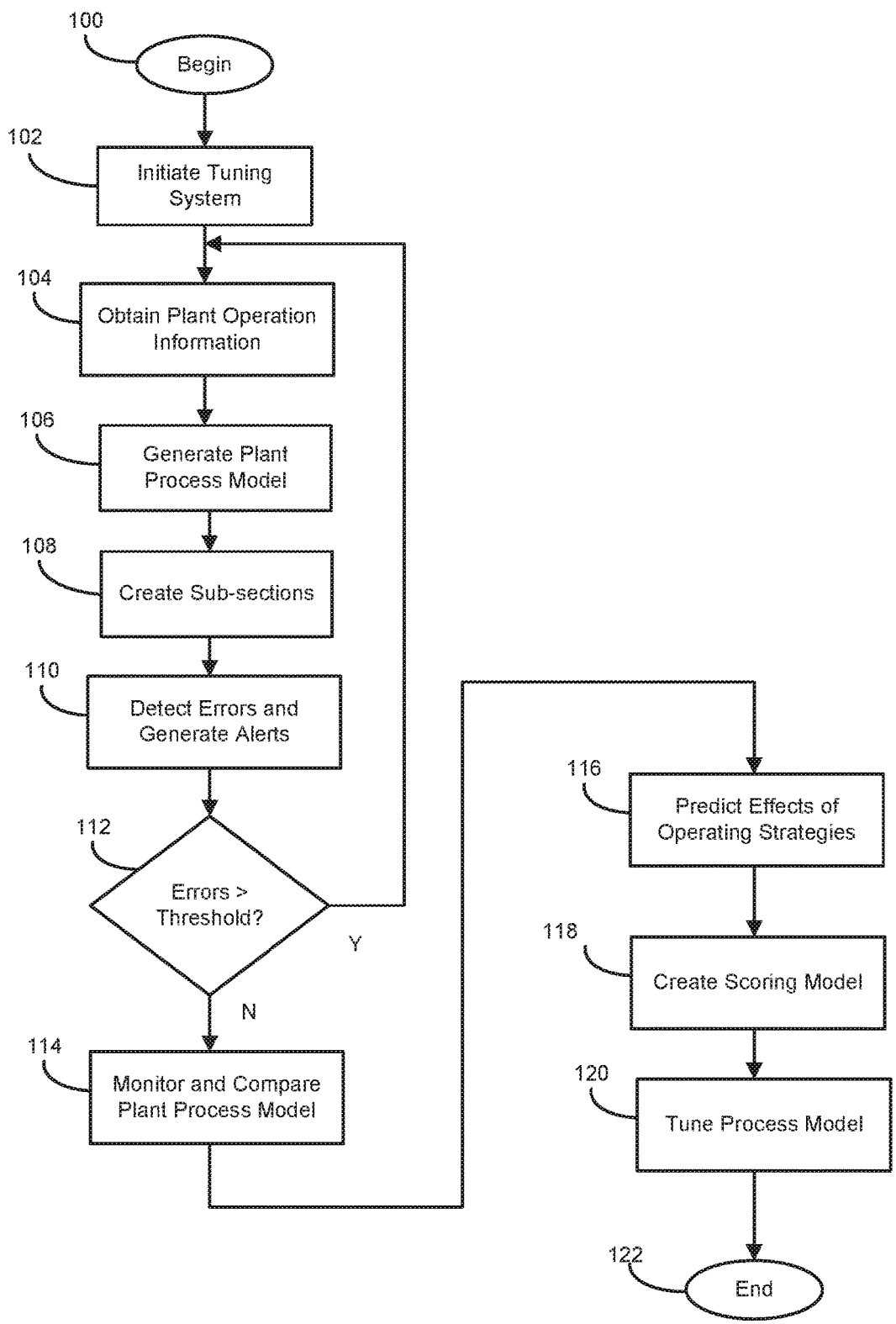
FIG. 3 depicts an illustrative tuning method in accordance with one or more embodiments of the present disclosure.

Referring now to FIG. 3, a simplified flow diagram is depicted for an illustrative method of improving operation of a plant, such as the plant 12a-12n of FIGS. 1 and 2, according to some embodiments. Although the following steps are primarily described with respect to the embodiments of FIGS. 1 and 2, the steps within the method may be modified and executed in a different order or sequence, one or more additional steps may be performed, and/or one or more depicted steps may be omitted.

The method begins at step 100. In step 102, the tuning system 10 may be initiated by a computer system that is inside or remote from the plant 12a-12n. The method may be automatically performed by the computer system, but the disclosure is not so limited. One or more steps may include manual operations or data inputs from the sensors and other related systems, as desired.

In step 104, the tuning system 10 obtains plant operation information or plant data from the plant 12a-12n over the network 16. The plant operation information may include plant operational parameters, plant process condition data, plant lab data, and/or information about plant constraints. The plant data may include one or more of: the plant operational parameter, the plant lab data, the plant constraint, and/or the plant process condition data. As used herein, "plant lab data" refers to the results of periodic laboratory analyses of fluids taken from an operating process plant. As used herein, "plant process data" refers to data measured by sensors in the process plant.

In step 106, a plant process model may be generated using the plant operation information. The plant process model may estimate or predict plant performance that is expected based upon the plant operation information (e.g., how the plant 12a-12n is operated). The plant process model results may be used to monitor the health of the plant 12a-12n and/or to determine whether any upset or poor measurement occurred. The plant process model may be generated by an iterative process that models plant performance at various plant constraints to determine the desired plant process model.

In step 108, a process simulation unit may be utilized to model the operation of the plant 12a-12n. Because the simulation for the entire unit may be large and complex to solve in a reasonable amount of time, each plant 12a-12n may be divided into smaller virtual sub-sections consisting of related unit operations. An exemplary process simulation unit 10, such as a UniSim® Design Suite, is disclosed in U.S. Patent Publication No. 2010/0262900, now U.S. Pat. No. 9,053,260, which is incorporated by reference in its entirety. The process simulation unit 10 may be installed in the optimization unit 30. Other illustrative related systems are disclosed in commonly assigned U.S. patent application Ser. Nos. 15/084,291 and 15/084,319 (both filed on Mar. 29, 2016), which are incorporated by reference in their entirety.

For example, in one embodiment, a fractionation column and its related equipment such as its condenser, receiver, reboiler, feed exchangers, and pumps may make up a sub-section. Some or all available plant data from the unit, e.g., temperatures, pressures, flows, and/or laboratory data may be included in the simulation as measured variables.

Multiple sets of the plant data may be compared against the process model. Model fitting parameters and/or measurement offsets may be calculated that generate the smallest errors.

In step 110, fit parameters or offsets that change by more than a predetermined threshold, and measurements that have more than a predetermined range of error, may trigger further action. For example, changes in offsets or fit parameters beyond a threshold amount of change may indicate the model tuning may be inadequate. Overall data quality for the set of data may then be flagged as questionable.

In step 112, when the change, difference, or range of error is greater than a predetermined value, control returns to step 104. Otherwise, control proceeds to step 114. Individual measurements with large errors may be eliminated from the fitting algorithm. In some embodiments, an alert message or warning signal may be raised to have the measurement inspected and rectified.

In step 114, the tuning system 10 may monitor and compare the plant process model with actual plant performance to ensure the accuracy of the plant process model. Typically, more effective process models are ones that more accurately reflect the actual operating capabilities of the commercial processes. This may be achieved by calibrating models to the reconciled data. For example, the model parameters may be manipulated (e.g., based on the reconciled data) so that the model agrees with the plant measurements. One or more operating variables, such as cut points and tray efficiencies, may be adjusted to minimize differences between measured and predicted performance. A cut point may include one or more column product compositions, which may be measured as a component contaminant in one or more products or as a fractional recovery of a particular component in one or more products. For example, a benzene product purity may consider the contamination of benzene by toluene or other contaminating components. The fractionation column may also be controlled to recover a certain fraction of the benzene in the benzene product. A tray efficiency may include the performance (e.g., degree of separation) of an actual fractionation column stage compared to a theoretical one. This calculation may be measured as a percentage. For example, in some embodiments, the tray efficiency may range from 20% to 90%. In some embodiments, upon a predetermined difference between the plant process model and actual plant performance, the plant process model may be updated, and the updated plant process model may be used during the next cycle of the method. The updated plant process model may also be used to optimize the plant processes.

In step 116, the plant process model may be used to accurately predict the effects of varying feedstocks and operating strategies. Consequently, regular updating or tuning of the plant process model using reconciled data may enable the refiner to assess changes in process capability. A calibrated, rigorous model of this type may enable refinery operations engineers and planning personnel to identify process performance issues, so that they may be addressed before they have a serious impact on operating efficiencies and/or performance.

For example, calculations such as yields, product properties, and/or coke production rate may be key indicators of process problems when examined as trends over time. Regular observation of such trends may indicate abnormal declines in performance or mis-operations. For example, if a rapid decline in C5+ hydrocarbon yields in a naphtha reforming unit is observed, this may indicate an increasing rate of coke production, which then may be traced back to an incorrect water-chloride balance in the reactor circuit or incorrect platforming feed pre-treatment. Alternatively or additionally, the plant process model may support improvement studies that consider short-term operational changes and/or long-term revamp modifications to generate improved performance of the unit.

In step 118, a scoring model may be created for determining a degree of trustworthiness of the current process model based on the plant operational parameters. Specifically, a trustworthiness score of the process model is generated based on comparisons between the plant operational parameters using a partial least squares (PLS) analysis, an orthogonal PLS (OPLS) analysis, and/or other suitable analytic techniques. As discussed above, the plant operational parameters may be compared with the performance process model results from the simulation engine based on the predetermined threshold values.

During operation, an output interface may be designed to directly relate operational performance (e.g., cost of production per ton of product)—which may be the concern of the plant tuning—to the primary operating variables of the plant (e.g., a flow of steam to a heat exchanger or set point on a column composition controller). This may be accomplished by relating the performance to the plant operation through a cascade of more detailed screens, each of which may be designed to allow the user to quickly view what variables are causing the departure from the target performance.

Figure 4:
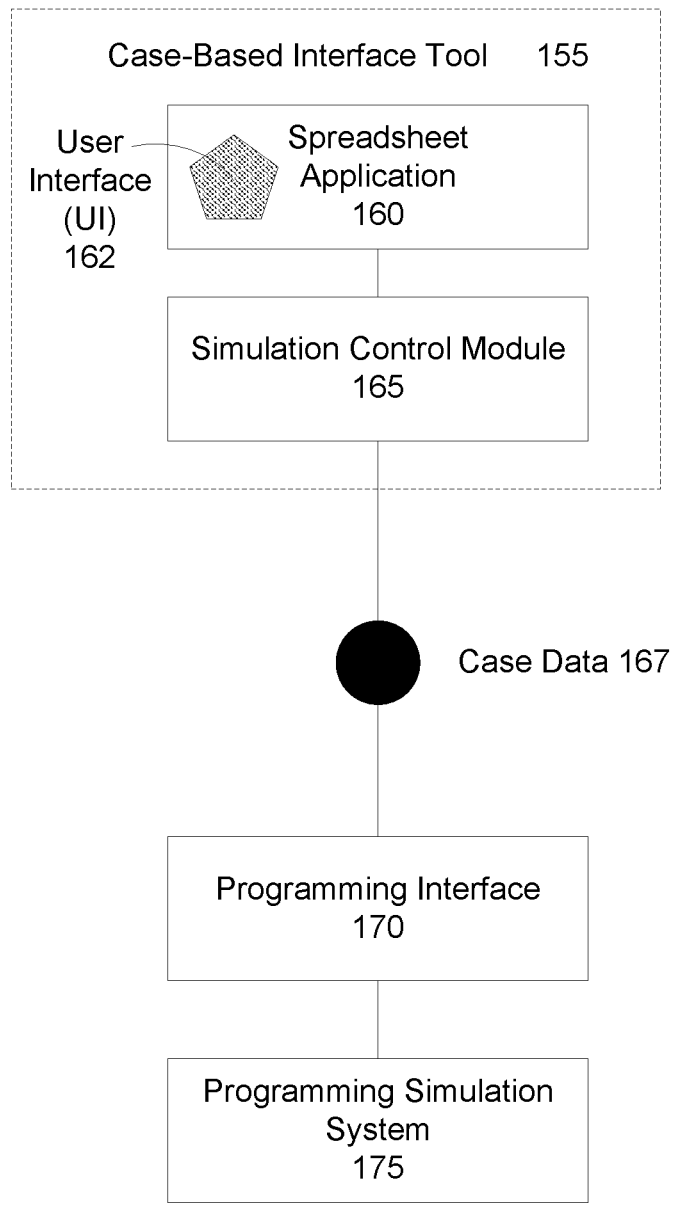
FIG. 4 is a schematic diagram depicting a system utilizing a case-based interface tool to provide case-based interaction with a process simulation system in accordance with embodiments of the inventive arrangements disclosed herein.

FIG. 4 is a schematic diagram depicting a system 150 utilizing a case-based interface tool 155 to provide case-based interaction with a process simulation system 175 in accordance with embodiments of the inventive arrangements disclosed herein. In system 150, a case-based interface tool 155 can be used to interact with the process simulation system 175 in lieu of and/or in addition to an existing and/or integrated user interface of the process simulation system 175. The simulation control module 165 and the programming interface 170 can together be considered an integration tool, which seamlessly integrate application 160 and system 175 so that a user interface of the spreadsheet application 160 can be linked to flowsheets (e.g., a process flow diagram) of system 175.

The integration tool can include data automation capabilities, case management capabilities, and/or calculation orchestration capabilities. Data automation can refer to linking/mapping simulation system 175 objects and properties to spreadsheet application 160 objects. The data automation can be based upon a flexible object model that exposes virtually all simulation system objects and their associated properties. In one embodiment, the interface 162 can be a data automation component that includes a browser interface for dynamically browsing system 175 and objects. The browser interface can consolidate all simulation system objects into one hierarchy and all properties of an object into another hierarchy. Case management mechanisms can assist with managing data from different runs of the same flowsheet (in a common spreadsheet) and managing data from different flowsheets within a common workbook. The calculation orchestration capabilities of the integration tool permit programmatic triggers to be established to ensure runs execute whether a set of previously defined conditions are satisfied. The calculation orchestration capabilities permits sequential batch processing of multiple runs to be initiated at a given time, where later runs can optionally utilize input data created during earlier ones.

In one embodiment, the spreadsheet application 160 can be a commercial off-the-shelf application, such as EXCEL, QUATROPRO, CALC, etc. The process simulation system 175 can also be a commercial off-the shelf system, such as UNISIM, HYSYS, ASPEN OTS, etc. Generally, spreadsheet application can be a computer program product that includes a graphic user interface for interacting with users. The graphical user interface can include a grid of a set of cells arranged in rows and columns. Each cell can be associated with a cell specific value able to be uniquely addressed as a spreadsheet object. The spreadsheet application can be configured to associate at least one formula with a cell. A value of the cell is able to be calculated based upon said associated formula.

Turning to specific components of system 150, the case-based interface tool 155 can represent a software application that can be configured to capture and exchange case data 167 with the process simulation system 175. Case data 167 can represent a set of user-configured parameters collected within the user interface 162 of the case-based interface tool 155 and/or the results of a simulation run by the process simulation system 175 for the set of user-configured input parameters. In various embodiments, output from multiple runs (e.g., one per spreadsheet column) on the same flowsheet can be presented in a single spreadsheet; different flowsheets can be associated with different spreadsheets of a single workbook. Additionally, calculations can be orchestrated using tool 155 so that sequenced runs can occur, based upon different input sets and producing different output data sets.

To perform these functions, the case-based interface tool 155 can utilize a spreadsheet application 160 and a simulation control module 165. The spreadsheet application 160 can represent a software program capable of storing data in a tabular format and performing various manipulations upon the data, such as calculations, comparisons, and graphing. Additionally, the spreadsheet application 160 can support the use of user-defined functions and/or program extensions like a MACRO.

The spreadsheet application 160 can be used as a vehicle for presenting the user interface 162 of the case-based interface tool 155. The user interface 162 can be configured to provide an input mechanism for case data 167 entered by a user (not shown). Additionally, resultant output case data 167 can be collectively presented within the user interface 162, utilizing the tabular format and/or data manipulation functions of the spreadsheet application 160.

In one embodiment, the spreadsheet application 160 can be a template with some specific format and structure features required by the case-based interface tool 155. That is, users of the interface 162 should start new work from an empty template or load an existing workbook created from a template configured for the tool 162. Multiple workbooks of a spreadsheet can be concurrently open, where an active workbook is the one that the case-based interface tool 155 controls.

The simulation control module 165 can represent a set of machine-readable instructions for managing the flow of data between the case-based interface tool 155 and the process simulation system 175. The simulation control module 165 can be capable of communicating with the spreadsheet application 160 and the process simulation system 175. Functions of the simulation control module 165 can include, but are not limited to, conveying case data 167 to the process simulation system 175, mapping case data 167 received from the process simulation system 175 to the corresponding areas of the user interface 162, triggering the execution of user-defined functions, triggering the execution of functions for the spreadsheet application 160 and/or process simulation system 175, and the like.

The simulation control module 165 can also be configured to automate the sequential execution of multiple sets of case data 167 by the process simulation system 175. That is, when the case-based interface tool 155 is provided with multiple sets of case data 167 for the same process, the simulation control module 165 can oversee the individual execution of each set of case data 167 by the process simulation system 175 without further action required by the user.

In one embodiment (elaborated upon in system 200), module 165 can be implemented as an add-in (e.g., an EXCEL add-in or "XLA" file, for example). In this embodiment, the XLA can be referenced in a special workbook (e.g., an eSim workbook), so that it is launched or enabled when an eSim workbook is opened or activated. The XML controls the eSim user interface through EXCEL menu and VISUAL BASIC (VB) forms. The XLA can also parse data through an eXtensible Markup Language (XML) format between a template workbook and interface 170, which can be an execution mechanism. Module 165 (e.g., the XLA) does not necessarily directly interact with system 175, but can utilize interface 170 as a communication intermediary. In one embodiment, the XLA (module 165) can be password protected to prevent incidental modification by the users.

The case-based interface tool 155 can utilize a programming interface 170 to communicate with the process simulation system 175. The programming interface 170 can represent a software application and/or set of software commands designed to act as an interface mechanism to a target system and/or application. For example, a programming interface 170 can translate received commands into the corresponding commands understood by the target system. In one embodiment, interface 170 can comprise a set of components (mostly DLLs) to interact with server side (system 175) components. That is, the interface 170 can provide data automation functionality to requests from module 165 (e.g., XLA requests).

The process simulation system 175 can represent one or more software applications and/or associated hardware components configured to perform a variety of calculations to simulate the execution of a defined process. Each simulation performed by the process simulation system 175 can be governed by a specified set of input parameters provided as case data 167.

In one embodiment, the simulation system 175 can be a simulator for the chemical processing (CPI) that mathematically models a process and its unit operations. System 175 can perform stead-state and/or dynamic simulations. System 175 can be used to create a process flow diagram or flowsheet which simulates a general flow of plant processes and equipment. That is, a flowsheet can model relationships between major equipment of a plant factory. System 175 can include a graphic design tool that includes a canvas upon which a flowsheet can be constructed using selectable flowsheet symbols, such as valves, pumps, tanks, vessels, heat exchangers, fans, lines, flow instruments, and other symbols.

Some specifics of system 150 will vary depending upon specifics of the spreadsheet application 160 and the process simulation system 175. For example, one contemplated embodiment uses EXCEL as the spreadsheet application 160 and UNISIM as the process simulation tool 175. In this embodiment, the application 160 can be an EXCEL worksheet based upon a template. The simulation control module 165 can be an EXCEL add-in (e.g., an XLA or XLL). The programming interface 170 can be the UOP UNISIM application interface control (AIC) that is a set of components, including numerous DLLs, developed by UOP RPM group to execute UNISIM runs on the server side.

Figure 5:
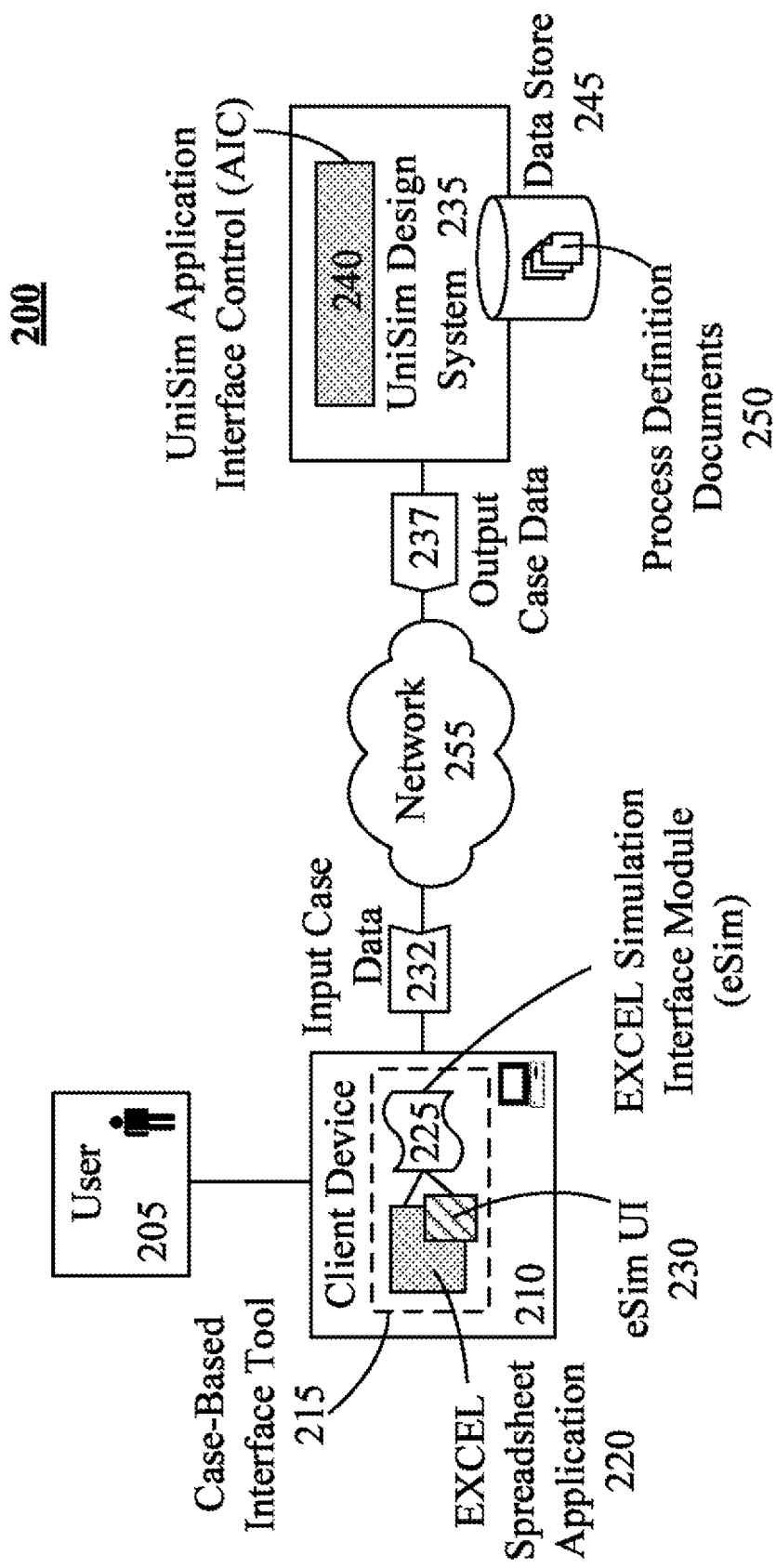
FIG. 5 is a schematic diagram illustrating a system for a case-based interface tool for the UNISIM DESIGN system in accordance with embodiments of the inventive arrangements disclosed herein.

FIG. 5 is a schematic diagram illustrating a system 200 for a case-based interface tool 215 for the UNISIM DESIGN system 235 in accordance with embodiments of the inventive arrangements disclosed herein. System 200 can represent a specific embodiment of system 150 of FIG. 4.

In system 200, a user 205 can utilize the case-based interface tool 215 running on a client device 210 to run simulations for input case data 232 using the UNISIM DESIGN system 235. The client device 210 can represent a variety of electronic computing devices capable of supporting operation of the case-based interface tool 215 and/or its components. Examples of a client device 210 can include, but are not limited to, a personal computer, a laptop computer, a hand-held computing device, a thin client, and the like.

The case-based interface tool 215 can consist of an EXCEL spreadsheet application 220, an EXCEL simulation interface module (eSim) 225, and the eSim user interface (UI) 230. The EXCEL spreadsheet application 220 can provide the case-based interface tool 215 with a variety of predefined functions for data analysis and graphical reporting as well as the foundation for the eSim UI 230.

The eSim UI 230 can present the user 205 with access to the functions supported by the eSim 225 as well as a user-friendly interface mechanism by which to enter input case data 232. The eSim UI 230 can be configured to utilize the inherent functions of the EXCEL spreadsheet application 220, such as data formatting and mathematical calculations. For example, the eSim UI 230 can correspond to an EXCEL template document containing areas designated for data entry and/or presentation.

Entry of the input case data 232 can include manual data entry that results in values for input parameters being directly captured using the eSim UI 230 and the specification of an external file containing the input case data 232 to be imported during execution of the simulation. The import functionality can be provided by the EXCEL spreadsheet application 220. It should be noted that the external file must be readable by the EXCEL spreadsheet application 220.

The data entry process of the eSim UI 230 can utilize the contents of process definition documents 250, often referred to as flowsheets, maintained by the UNISIM DESIGN system 235 within a data store 245. A process definition document 250 can define the data elements and their associated properties utilized by the UNISIM DESIGN system 235 to perform a simulation of the process. Thus, the case-based interface tool 215 can limit data entry into the eSim UI 230 to the data elements contained within the corresponding process definition document 250. Doing so can ensure data type compatibility between the input case data 232 and the data expected by the UNISIM DESIGN system 235.

Upon completion of data entry, the user 205 can execute a command requesting that the eSim 225 run the simulations using the UNISIM DESIGN system 235 for the input case data 232. The eSim 225 can then convey each set of input case data 232 over the network 250 to the UNISIM DESIGN system 235. Messages utilized by the eSim 225 to convey the input case data 232 can also include commands that can be interpreted by the UNISIM application interface control (AIC) 240 to allow the eSim 225 to configure the simulation.

Performance of a simulation by the UNISIM DESIGN system 235 for a set of input case data 232 can produce a set of output case data 237. The output case data 237 can be returned to the case-based interface tool 215 using the network 255 and/or UNISIM AIC 240. The eSim 225 can process the output case data 237 for presentation within the eSim UI 230.

Processing of the output case data 237 can include the performance of one or more functions, either user-defined or inherent to the EXCEL spreadsheet application 220, upon one or more data values. For example, the value of an input parameter of the next input case can be modified when a simulated result value falls within a user-defined range, allowing for the input parameters of the input case data 232 to be gradually modified based upon the output case data 237.

It is important to emphasize that the case-based interface tool 215 illustrated in system 200 provides functionality currently unavailable in the present interface provided for the UNISIM DESIGN system 235. For example, using the EXCEL spreadsheet application 220 provides users 205 with the ability to specify multiple sets of input case data 232 at one time as well as to collectively view the corresponding output case data 237. Additionally, output case data 237 can be graphically presented as graphs or charts to increase synthesis and comprehension.

In an alternate embodiment, the EXCEL spreadsheet application 220 and/or the eSim UI 230 and/or the eSim 225 can be remotely located to but accessible by the client device 210. For example, these components 220/225/230 can be located upon a server (not shown) that is accessible to the client device 210 over the network 250 and to which the user 205 has the proper privileges.

Network 255 can include any hardware/software/and firmware necessary to convey data encoded within carrier waves. Data can be contained within analog or digital signals and conveyed though data or voice channels. Network 255 can include local components and data pathways necessary for communications to be exchanged among computing device components and between integrated device components and peripheral devices. Network 255 can also include network equipment, such as routers, data lines, hubs, and intermediary servers which together form a data network, such as the Internet. Network 255 can also include circuit-based communication components and mobile communication components, such as telephony switches, modems, cellular communication towers, and the like. Network 255 can include line based and/or wireless communication pathways.

As used herein, presented data store 245 can be a physical or virtual storage space configured to store digital information. Data store 245 can be physically implemented within any type of hardware including, but not limited to, a magnetic disk, an optical disk, a semiconductor memory, a digitally encoded plastic memory, a holographic memory, or any other recording medium. Data store 245 can be a stand-alone storage unit as well as a storage unit formed from a plurality of physical devices. Additionally, information can be stored within data store 245 in a variety of manners. For example, information can be stored within a database structure or can be stored within one or more files of a file storage system, where each file may or may not be indexed for information searching purposes. Further, data store 245 can utilize one or more encryption mechanisms to protect stored information from unauthorized access.

It should be appreciated that specifics of embodiment 200 can be adapted to utilize other software applications than those illustrated. For example, in one embodiment, COREL QUATROPRO, STAROFFICE CALC, or other spreadsheet applications can be directly substituted for the EXCEL application 220 shown. Similarly, although the embodiment shown by system 200 uses the UNISIM DESIGN SYSTEM 235, other process modeling applications (e.g., HYSYS, ASPEN OTS, INVENSYS, DYNSIM, FANTOFT, TRIDENT, etc.) can be utilized in other embodiments of the disclosure.

Figure 6:
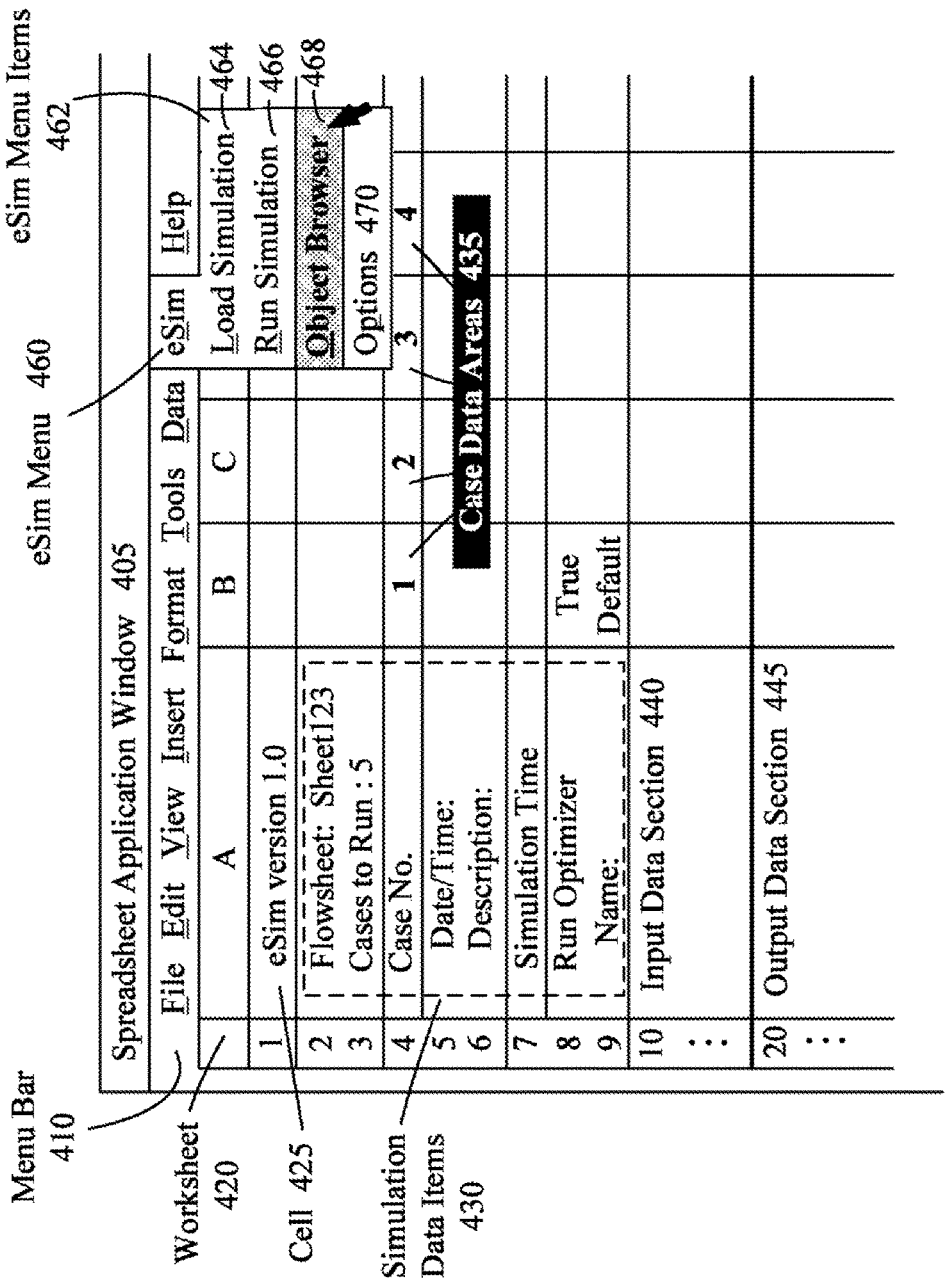
FIG. 6 is an illustration of a sample eSim user interface in accordance with an embodiment of the inventive arrangements disclosed herein.

FIG. 6 is an illustration of a sample eSim user interface 400 in accordance with an embodiment of the inventive arrangements disclosed herein. Sample eSim user interface 400 can be utilized by systems 150, 200, and/or a method. It should be noted that the sample eSim user interface 400 is for illustrative purposes only and is not meant as a definitive embodiment.

The sample eSim user interface 400 can be presented within a spreadsheet application window 405 of the spreadsheet application utilized by the eSim interface. The spreadsheet application window 405 can be a template for a spreadsheet workbook customized for integration with the process simulation system. A worksheet name can be customized as desired and additional worksheets can be inserted by a user as needed. In one embodiment, color coding can be established so that color-filled cells appearing on the main sheet are reserved. That is, a user may only be able to modify cells of the worksheet without a previously established background color. In one embodiment, a hidden worksheet (e.g., an application control template) can exist which stores eSim options. This hidden worksheet is intended to be preserved and remain hidden.

In one embodiment, a number of ranges can be defined, where modifying or deleting any of these ranges can break underlying code (e.g., VBA code). Thus, these ranges can be protected. Users can add customized ranges for user established purposes.

In one embodiment, different sections of the worksheet can be reserved from inputs to the process simulation system and outputs from the process simulation system. In other words, in one implementation it can be impossible to mix inputs and outputs together and/or to have multiple input and output sections co-exist with each other.

Numerous standards can be established for the spreadsheet interface. As shown, the worksheet 420 can consist of cells 425 identifiable by a unique combination of row and column names. In this example, cell 425 can be identified as row 1, column A. The specific properties of a cell 425, such as data type and format, can be defined by the eSim user interface 400 within the limitations of the underlying spreadsheet application.

The worksheet 420 of the sample eSim user interface 400 can present a variety of information to the user. Of particular note in this example are the simulation data items 430, the case data areas 435, the input data section 440, and the output data section 445.

The simulation data items 430 can represent a variety of fields that present and/or accept data regarding the execution of the simulation by the process simulation system. Examples of simulation data items 430 shown in the sample eSim user interface 400 can include, but are not limited to, the name of the flowsheet corresponding to the process being simulated, the quantity of cases to run the simulation, a description of the simulation, the use of an optimizer during simulation and the name of the optimizer, and the like.

The case data areas 435 can represent sections of the worksheet 420 that collectively identify all data associated with the simulation of a single case. For example, all data associated with the simulation of case 1 will be located in column B of the worksheet 420, case 2 in column C, and so on. This format of case data areas 435 within the worksheet 420 can allow a user to easily compare data values side-by-side for multiple simulations.

The input data section 440 can represent the section of the worksheet 420 where input parameters for the simulation whose values have been configured by the user can be presented. Since the validity of input parameters is crucial for the proper functioning of the process simulation system, the entry of items into the input data section 440 can utilize a specialize mechanism, such as the "Add Input Data" eSim menu item 418.

The output data section 445 can contain the results of the simulation run by the process simulation system utilizing the corresponding user-configured input parameters contained in the input data section 440. The data items listed in the output data section 445 can depend upon the process being simulated. Additionally, data manipulation functions supported by the spreadsheet application can be executed upon the raw values of the data items prior to being displayed in the output data section 445.

It should be appreciated that interface 400 illustrates one contemplated layout and that others are contemplated. These layouts can conform to standards designed to make working with the interface and/or linking to flowsheets easier. As an example of a standard, the following conventions (shown in the below tables) can be imposed upon one implementation of an eSim user interface. These conventions are presented for proof of concept and descriptive purposes only and are not to be construed as a constraint upon the scope of the present disclosure, which can adhere to any definable standard conventions.

| ROW | CONVENTION DESCRIPTION |
| --- | --- |
| Row 1 | eSim template version number, text can be unrestricted |
| Row 3 | Flowsheet file name |
| Row 4 | Calculation case ID (number cases supported) |
| Row 6 | Run numbers of calculation case, used in run simulation form |
| Row 7-8 | Descriptions associated with calculation case |
| Row 9 | Simulation time lapse records showing time required for calculations |
| Row 10 | Trigger for simulation system optimizer, set to true or false |
| Row 11 | Optimizer parameter (e.g., UOPStatic Optimizer.Optimize) |
| Row 12 | Name of the optimizer (multiple optimizers can exist for a flowsheet, but a restriction can exist to run only one at a time) |
| Row 13 | Name of an associated spreadsheet for the optimizer |
| Row 14 | Flag to turn on/off an optimizer |
| Row 16-21 | Input data section - auto expandable, having a characteristic background color (e.g., pale yellow) - portions of the rows can be deleted and named ranges can still be maintained |
| Row 23-30 | Output data section - auto expandable, having a characteristic background color (e.g., light blue) - portions of the rows can be deleted and named ranges can still be maintained. |

| COLUMN | CONVENTION DESCRIPTION |
| --- | --- |
| Column A | Object/property XML path - when configuring eSim, active cells must be in Column A |
| Column B | Description of the eSim object/property |
| Column C | Unit of Measure (conforms to USD optimizer recognizable names) browser can add the units based upon user selection |
| Column D | Usable for any purpose, but should not be deleted |
| Column E-IT | Supports a total of 250 calculation runs |
| Column IU-IV | Not reserved, can be customized by user for any purpose |

As shown in interface 400, the spreadsheet application window 405 can present the user with a menu bar 410, which can be modified to offer an eSim menu 460.

User-selection of the eSim menu 460 can present a variety of eSim menu items 462 corresponding to functions supported by the eSim. The eSim menu 460 can be automatically added to the spreadsheet application window 405 when the eSim user interface 400 is initiated. As shown in this example, the eSim menu 460 contains eSim menu items 462 for loading existing simulation data 464, running a simulation 466, activating the object browser 468, and modifying configuration options 470. Additionally, eSim menu items 462 can be incorporated into other selection mechanisms supported by the spreadsheet application, such as context menus and short-cut key combinations.

The load simulation option 464 can specify which simulation flowsheet is to be worked on in the eSim environment. In one embodiment, if a file has been previously selected (saved at range "eSim_UniSimFlowsheetPath") it will automatically launch the file. Otherwise, a file browser can be active for a user to pick a working simulation flowsheet file. The linkage between the simulation system and the spreadsheet application can be dynamic in that the flowsheets presented for selection responsive to a selection of option 464 can be updated to reflect changes in flowsheet files. Thus, each time a user creates a new flowsheet using a simulation system, that new flowsheet will be available for selection within the eSim interface.

The run simulation option 466 can automate a transfer of data between the spreadsheet application and the process simulation system in accordance with established mappings. In one embodiment, selection of option 466 can open up a run simulation interface. Selection of a run button of the simulation interface can cause simulation calculations to be performed. Numerous modes can exist for simulation executions associated with the run option 466. The modes can include, for example, a run mode, a get inputs mode, a set inputs mode, and a get outputs mode. The run mode can be a default option that is the equivalent to performing a set of actions including: setting inputs in the simulation system, triggering flowsheet calculations/processes, delaying for flowsheet processing to complete, receiving results from flowsheet processing. The get input mode can populate input sections of a spreadsheet linked to a flowsheet with values embedded in the flowsheet. The set inputs mode can set inputs into the simulation system. No calculations or flowsheet processes are triggered nor is output requested when in set inputs mode. The get outputs mode fills output sections of a spreadsheet with data embedded in a flowsheet. This mode can be useful in troubleshooting a flowsheet.

The object browser option 468 activates an object browser interface (such as interface 500). The object browser is used to map or link data references between a spreadsheet and a designated flowsheet. The object browser permits inputs and outputs to be configured in accordance with a flexible object model. That is, effectively all objects and object properties of the simulation system can be presented for selection and linkage to spreadsheet objects. This linkage occurs dynamically at runtime and does not relay upon static extension associated with simulation system objects and/or properties. Thus, changes made to the simulation system, such as code changes to add new objects and/or object properties, are automatically handled by the eSim interface tool without code modifications being needed.

In other words, the eSim interface tool does not require a priori knowledge of names and simulation system objects/properties. These names and properties are queried upon object navigator activation and used to dynamically build two different hierarchies, one for objects and another for object properties.

Figure 7:
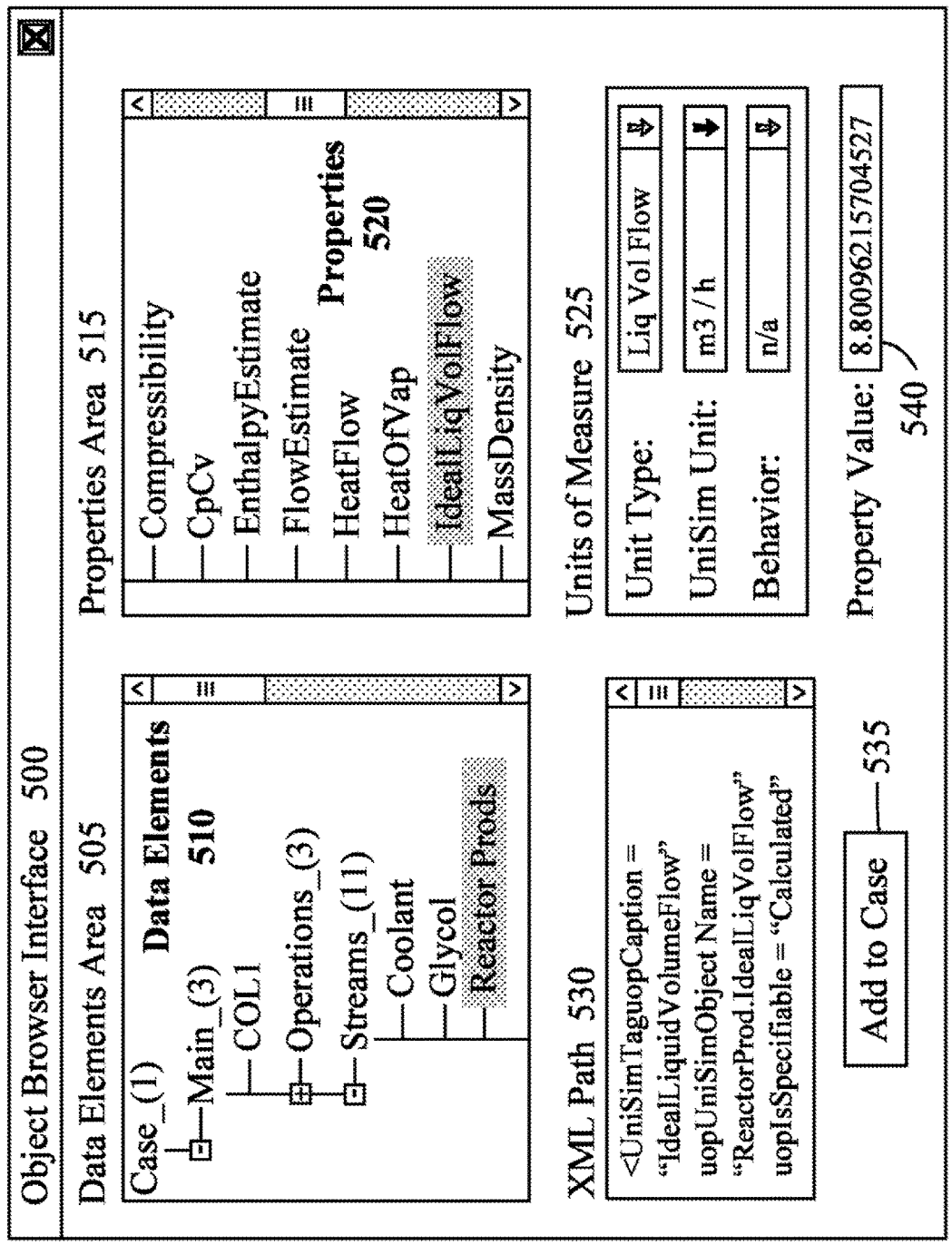
FIG. 7 is an illustration of a sample object browser interface for use with the eSim user interface in accordance with an embodiment of the inventive arrangements disclosed herein.

FIG. 7 is an illustration of a sample object browser interface 500 for use with the eSim user interface in accordance with an embodiment of the inventive arrangements disclosed herein. The object browser interface 500 can be utilized in conjunction with the eSim user interface 400 of FIG. 6.

The object interface 500 can represent the user interface mechanism used to map processing simulation system objects and properties to spreadsheet objects. When invoked, programmatic code can first check to see if an object navigation object currently exists linking an open spreadsheet application file (e.g., workbook or spreadsheet) to flowsheet objects and properties. If so, the object navigation object, which can be a saved mapping file, can be opened. This file can be edited via user interactions with interface 500. Otherwise, an object navigation file can be created and stored.

The add input data interface 500 can include a data elements area 505, a properties area 515, an extensible markup language (XML) path area 530, a units of measure area 525, a property value 540, and an ADD button 535. The data elements area 505 can visually present the data elements 510 utilized by the process simulation system to simulate the process. A data element 510 can abstractly represent a container for properties 520 used within the simulation. The data elements 510 can be organized and presented as a hierarchical tree structure.

It should be emphasized, that the object navigation interface 500 can be dynamically populated at runtime in accordance with a flexible object model. Hence, no a priori knowledge of (simulation) object names is needed by an integration tool. For example, in one embodiment, the eSim integration tool can cause a control module (e.g., module 165, which can be an XLA) to call programming interface (e.g. interface 170) for unit sets and save them in a global variable for subsequent uses. The XLA can call the simulation interfaces (DLLs) to dynamically obtain a list of top objects, which can include flowsheets, streams, and operations. In one implementation, only the top three layers of the hierarchy need to be read in the initial loading of the flowsheet to save time and XML size. An object browser form can then be activated. The object tree view (data elements area 505) can then be populated with the top three layers of objects, as shown by data elements 510.

All supported process simulation objects can be displayed in a hierarchy as data elements 510. In one embodiment, by default, nodes can be stored by name and can be case insensitive. Node names can be concatenated with a number of subsequent child nodes in the format of "_( )". A single click on a node can be sufficient to expand its underlying structure. The object nodes can be read dynamically from the process simulation system through programming interface (e.g. interface 170), which causes the tree nodes in interface area 505 to expand accordingly.

Whenever an object is active in the data elements area 505, which can be changed by clicking a displayed object, its immediate properties are obtained dynamically and displayed in the properties area 515. Area 515 can display the various properties 520 of a selected object in a property tree. In one embodiment, property 520 names in the property tree can be appended by number of child nodes in the format of "_( )". For a matrix, the format is "_(,)".

Properties in the Property Tree displayed in area 515 can be color-coded, based on their specific abilities. For example, a black color can denotes calculated and blue can represent specifiable. Red can represent a default value; green can represent unknown; light silver can represent unsupported; pinkish can represent mixed (e.g., for vector/matrix, some are calculated while others are specified). In one embodiment, only first and last elements of a vector can be checked. Specifiability for matrix may not be supported. The interface 500 can treats a scalar in a vector/matrix differently from a true scalar. The former can be called a UnisimElement, while the latter can be called a UnisimTag.

If a "Hide Calculated in Input" option of interface 500 is enabled, the Property Tree shown in properties area 515 will be filtered out all calculated properties when the active cell falls in the input range. This is to prevent specifying calculated variables. Other options can be established for interface 500, and the "Hide Calculated in Input" option is provided as one contemplated example.

The XML path area 530 can display the XML attributes and values that can provide the underlying communicative link between the spreadsheet cell containing the user-configured input parameter and the process simulation system. The XML displayed within the XML path area 530 can be automatically generated by the case-based interface tool and can be optionally modified by the user.

For example, when a property 520 is in selected, its associated XML interpretation can be displayed in XML Path text box 530. The text in the text box can be copied to the active cell when the button "Add XML" 535 is clicked. Although editable, there may be no need to modify the text string manually. In one embodiment, it can be possible to hide the XML Path textbox 530 and to utilize interface 500 space for other purposes.

The units of measure area 525 can present the user with unit of measure options for the selected property 520. When allowed, the user can elect to change the unit of measure of the property from the unit of measure used by the process simulation system. For example, the user could change the options of the units of measure area 525 such that the displayed unit of measure would be ft3/s instead of m3/h. The conversion between specified units of measure can utilize the inherent functions of the underlying spreadsheet application.

The property value 540 can display the current value of the selected property 520. When allowed, the user can modify the property value 540. The add input data interface 500 can include data validation functions to ensure that changes to the property value 540 are within acceptable limits.

It should be noted that one special data element 510 that may require special handling in the object browser interface 500 is a simulation spreadsheet object. In one embodiment, a simulation spreadsheet object is selected in object tree area 505, only the last cell in the spreadsheet object is listed in property tree shown in area 515. When the last cell is selected in property tree, a set of spreadsheet object can be presented. The user can use those options to select the specific spreadsheet cell, such as column B, row Seven.

In one embodiment, numerous browser options can be associated with interface 500. These options can include, for example, a Use Description Option, a Hide Calculated in Input option, and a SS Cell Auto Move Right option. The Use Description option when enabled will permit the eSim interface to use simulation system object and property names to fill out the description of spreadsheet objects. This can be a nice feature to have when the user likes to quickly configure an eSim workbook but does not want to spend much time filling the descriptions. The Hide Calculated in Input option can allow eSim browser to filter out all the calculated properties when the active cell is within input range. This is to prevent accidental mapping of non-specifiable properties in input section. The SS Cell Auto Move Right options can be associated with the simulation system spreadsheet. When configuring a spreadsheet, the cell reference can move downward (by default) (row number ++1). By checking this option, the cell reference will move right (column number ++1 instead).

These options are not intended to be exhaustive and other configurable options for the eSim integration tool are contemplated. These options can help users configure, run, and manage eSim applications. In one embodiment, option values can be saved in a hidden "App Control Template" worksheet in an eSim workbook. The options can be grouped into categories, such as run options, browser options, and other.

Run options can include options shown in the following run option table (Note the following tables assume a UNISIM and EXCEL embodiment).

| OPTION NAME | DESCRIPTION |
| --- | --- |
| Run UniSim in Visible | UniSim will be visible when its calculation is ongoing, default = yes |
| UniSim Leave Open | UniSim flow sheet will not be closed after each calculation case, default = yes; if yes, the initial guess for second calc. case is the result of first calc. case; if no, the initial guess for each calc. case is whatever was saved in the flow sheet file |
| Save Change on Close | UniSim flow sheet will be save after each calc case, default = no |
| Run Oil Manager | Turn on AIC oil manager functionalities, default = no; no well tested |
| Force Download | Force UniSim application to reload the flowsheet each time a calc case is triggered, default = no |
| Disable PreCalc Macro | Disable an exposed macro eSim_UserPreCalc, default = yes; hint: customizable code can be executed before each case is triggered. For example, when multiple cases are triggered, PreCalc can massage the input data of current case based on the results of previous case. PreCalc code can be customized for each iteration for each calculation case. |
| Disable PostCalc Macro | Disable an exposed macro eSim_UserPreCalc, default = yes; hint: customizable code can be executed before each case is triggered. For example, when multiple cases are triggered, PreCalc can massage the input data of current case based on the results of previous case. PreCalc code can be customized for each iteration for each calculation case. |
| Case Iterations | Number of iterations one case will be run, default = 1; hint: it is possible to run each case multiple times, combined with PreCalc and PostCal macros, one has the flexibility to do even the most complicated task in one case. |

Browser options can include options shown in the following option table (Note the following tables assume a UNISIM and EXCEL embodiment).

| OPTION NAME | DESCRIPTION |
| --- | --- |
| Auto Description | eSim browser generates descriptions for object (Property) automatically, default = no; the option can be overridden in browser form; hint: object is bold; property is in XML Path format in ( ). Nice feature to generate description in eSim template column B |
| EXCEL Auto Move Down | This option is set to yes and not resettable. Once a object/property is set, the active cell is automatically moved down by one cell so the new active cell can be configured, default = yes |
| UniSim SS | SS stands for spreadsheet, default = yes; the option can |

-continued

| OPTION NAME | DESCRIPTION |
| --- | --- |
| Auto Move Down | be overridden in browser form; it is a neat feature to have when one maps EXCEL cells to UniSim spreadsheet cells. EXCEL active cell is automatically moved down. Turn on this option will also automatically move UniSim Spreadsheet cell down (row number ++1). If this option is off (no), UniSim spreadsheet cell will automatically move right (column number ++1). |
| Allow UniSim SS Overrun | Allow eSim to map to the cell beyond UniSim spreadsheet boundary; default = no |
| Configure Matrix by Row | Default = yes; if no, then matrix will be grouped by column; the option can be overridden in browser form |
| Check Input Specifiable | When one configures eSim input section, eSim will check specifiability of the object/property one is adding. If not specifiable, a warning message pops up. User still has the option to add the object/property anyway or cancel; default = yes |
| Hide XML Path | When selected, a textbox showing XML info will be hidden and object node tree will be expanded to fill the void, that gives more real estate to object window to display more items, default = no; this option is actionable immediately |
| Object/Property Sorted | Default = yes, when selected, all items at the same level in both object and property windows are sorted. This option is needed when one is working on a large flowsheet; Names in column stages, vectors, and matrices are never sorted. |
| Hide Calculated in Input | Default = yes, the option can be overridden in browser form; if the option is yes, when active cell is in column A of input section, all the calculated objects will be filtered out, e.g., they will not be in property tree view |
| Analyze Specifiable | Default = yes; when selected, eSim will request AIC to analyze specifiability of each property associated with an object; hint: uncheck this option will speed up eSim browsing |

Other options can include options shown in the following option table (Note the following tables assume a UNISIM and EXCEL embodiment).

| OPTION NAME | DESCRIPTION |
| --- | --- |
| Show Error in Dialog | When enabled errors are displayed in a dialog window, otherwise they are not presented within a GUI interface. Default = enabled |
| Write Error in Log file | When enabled, errors are written to a log file and otherwise are not. Default = Disabled |

A benefit of the method is its long-term sustainability. Often, projects to improve plant performance may achieve reasonable benefits for a modest duration, but these improvements decay over time. This decay is usually the result of inadequate time and expertise of available in-house technical personnel. Web-based optimization using the method may help operators bridge existing performance gaps and better leverage the expertise of their personnel in a way that may be sustained in the long term.

Some plant operators have attempted to use locally installed process models to address the optimization needs of a refinery. While several such process model offerings exist in the marketplace, these tools lose value over time, as there are inadequate methods for keeping them tuned (e.g., modeling catalyst deactivation, temporary equipment limitations, and the like) and configured to take into account plant flow scheme and equipment modifications. In this configuration, over time, the investment made in acquiring such models does not deliver the intended value. Additionally, the cost associated with performing the model maintenance function may be relatively large and the expertise difficult to maintain or replace. The web-enabled platform specifically addresses these shortcomings by remotely hosting and maintaining the models.

Beyond the technical benefits, implementation of the web-based method of the present tuning system 10 may deliver tangible benefits that address the customer's managerial challenges. Such a service may aid in improving training and development of technical personnel, automation of business processes, and/or development of operational excellence. Training of new engineers and operators may be simplified, as there is a central repository of knowledge about the individual process units. Furthermore, engineers may more easily be rotated among several process units to give them broader experience. This rotation may be done with the assurance that consistency of knowledge is transferred by highly repeatable remote performance monitoring processes and by professionals interacting with skilled technical services personnel.

In step 120, the current process model may be tuned to correctly represent the true potential performance of the plant based on the scoring model. The process model is further tuned to ensure that the simulation process matches the reconciled plant data. The tuned simulation engine is used as a basis for the optimization case, which may be run with a set of the reconciled data as an input. The output from this step is the optimized data. As a result, future operations of the plants 12a-12n may be optimized, and productions may be maximized.

A business optimization work process may be made more predictable by providing a common platform for viewing results to the various stakeholders, such as planners, managers, engineers, and technicians. For example, the tuning system 10 may be used to provide a simplified and robust look at process units at various locations, thereby allowing quick allocation of resources to process units that either have the highest feed processing opportunity or the most need for maintenance and upgrade.

Further advantage may be achieved by utilizing a common infrastructure that establishes links between the plant process and performance. Some or all process, analytical, and/or performance data may be used to generate and/or provide reports that are linked through process models. Thus, operators may effectively communicate and make decisions from a common set of information, thereby driving the whole organization to focus on continuous performance maximization. The method ends at step 122.

While a particular embodiment of the present tuning system has been described herein, it will be appreciated by those skilled in the art that changes and modifications may be made thereto without departing from the disclosure in its broader aspects and as set forth in the following claims.

Specific Embodiments

While the following is described in conjunction with specific embodiments, it will be understood that this description is intended to illustrate and not limit the scope of the preceding description and the appended claims.

A first embodiment is a system for improving operation of a plant, the tuning system including a server coupled to the tuning system for communicating with the plant via a communication network; a computer system having a web-based platform for receiving and sending plant data related to the operation of the plant over the network; a display device for interactively displaying the plant data; and a reconciliation unit configured for reconciling actual measured data from the plant in comparison with a performance process model result from a simulation engine based on a set of predetermined reference or set points, wherein the reconciliation unit performs a heuristic analysis against the actual measured data and the performance process model result using a set of predetermined threshold values. An embodiment is one, any or all of prior embodiments in this paragraph up through the first embodiment in this paragraph, wherein the reconciliation unit receives the plant data from the plant via the computer system, and the received plant data represent the actual measured data from equipment in the plant during a predetermined time period. An embodiment is one, any or all of prior embodiments in this paragraph up through the first embodiment in this paragraph, further including an interface module configured for providing an interface between the tuning system, a database storing the plant data, and the network. An embodiment is one, any or all of prior embodiments in this paragraph up through the first embodiment in this paragraph, further including a prediction unit configured for predicting a trustworthiness of a current process model of the simulation engine based on the comparison of the plant data. An embodiment is one, any or all of prior embodiments in this paragraph up through the first embodiment in this paragraph, wherein the prediction unit calculates a trustworthiness score of the corresponding process model based on the comparison of the plant data using an analytic technique. An embodiment is one, any or all of prior embodiments in this paragraph up through the first embodiment in this paragraph, wherein the prediction unit creates a scoring model for determining a degree of trustworthiness of the corresponding process model based on at least one plant operational parameter. An embodiment is one, any or all of prior embodiments in this paragraph up through the first embodiment in this paragraph, wherein the trustworthiness score is weighted based on an amount of difference between the plant data and the corresponding predetermined threshold values. An embodiment is one, any or all of prior embodiments in this paragraph up through the first embodiment in this paragraph, wherein the scoring model is updated with a weighted trustworthiness score, and the current process model is adjusted or tuned based on the scoring model. An embodiment is one, any or all of prior embodiments in this paragraph up through the first embodiment in this paragraph, wherein the prediction unit cumulatively calculates a difference between a selected plant parameter and the corresponding performance model result during a predetermined time period to determine a fitness of a simulation related to the operation of the plant. An embodiment is one, any or all of prior embodiments in this paragraph up through the first embodiment in this paragraph, further including an optimization unit configured for optimizing at least a portion of the plant based on a trustworthiness score of a plant process model. An embodiment is one, any or all of prior embodiments in this paragraph up through the first embodiment in this paragraph, wherein the optimization unit defines an objective function as a user-defined calculation of a total cost of the operation during a particular process, including materials consumed, products produced, and utilities utilized, subject to at least one constraint. An embodiment is one, any or all of prior embodiments in this paragraph up through the first embodiment in this paragraph, further including an analysis unit configured for determining an operating status of the plant based on at least one of a kinetic model, a parametric model, an analytical tool, and a related knowledge and best practice standard. An embodiment is one, any or all of prior embodiments in this paragraph up through the first embodiment in this paragraph, wherein the analysis unit determines a target operational parameter of a final product of the plant based on at least one of an actual current operational parameter and a historical operational parameter.

A second embodiment is a method for improving operation of a plant, the tuning method including providing a server coupled to a tuning system for communicating with the plant via a communication network; providing a computer system having a web-based platform for receiving and sending plant data related to the operation of the plant over the network; providing a display device for interactively displaying the plant data, the display device being configured for graphically or textually receiving the plant data; obtaining the plant data from the plant over the network; generating a plant process model based on the plant data for estimating plant performance expected based on the plant data; monitoring a health of the plant based on the plant process model; reconciling actual measured data from the plant in comparison with a performance process model result from a simulation engine based on a set of predetermined reference or set points; creating a scoring model for determining a degree of trustworthiness of the plant process model based on the plant data; and tuning the plant process model based on the scoring model for representing a potential performance of the plant. An embodiment is one, any or all of prior embodiments in this paragraph up through the second embodiment in this paragraph, further including performing a heuristic analysis against the actual measured data and the performance process model result using a set of predetermined threshold values. An embodiment is one, any or all of prior embodiments in this paragraph up through the second embodiment in this paragraph, further including detecting an error in the tuning of the plant process model based on a predetermined threshold or range. An embodiment is one, any or all of prior embodiments in this paragraph up through the second embodiment in this paragraph, further including monitoring and comparing the plant process model with actual plant performance to ensure an accuracy of the plant process model. An embodiment is one, any or all of prior embodiments in this paragraph up through the second embodiment in this paragraph, further including predicting an effect of an operating strategy of the plant based on the tuning of the plant process model. An embodiment is one, any or all of prior embodiments in this paragraph up through the second embodiment in this paragraph, further including calculating a trustworthiness score of the plant process model based on the comparison of the plant data using an analytic technique. An embodiment is one, any or all of prior embodiments in this paragraph up through the second embodiment in this paragraph, further including generating a set of reconciled plant data of the simulation engine based on the tuned plant process model.

Without further elaboration, it is believed that using the preceding description that one skilled in the art may utilize the present disclosure to its fullest extent and easily ascertain the essential characteristics of this disclosure, without departing from the spirit and scope thereof, to make various changes and modifications of the disclosure and to adapt it to various usages and conditions. The preceding embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A system for enhancing operation of a chemical plant, the system comprising:
   a furnace comprising one or more tubes inside the furnace;
   one or more thermocouples affixed to the one or more tubes inside the furnace;
   a fractionation column;
   a reboiler associated with the fractionation column;
   a receiver associated with the fractionation column;
   a feed exchanger associated with the fractionation column;
   an interface platform comprising:
      one or more processors of the interface platform;
      a communication interface of the interface platform and in communication with the one or more thermocouples affixed to the one or more tubes inside the furnace; and
      non-transitory computer-readable memory storing executable instructions that, when executed by the one or more processors of the interface platform, cause the interface platform to:
         receive, from the one or more thermocouples, measured surface temperature data for the one or more tubes inside the furnace; and
         provide the measured surface temperature data to a database configured to store the measured surface temperature data;
   an optimization platform comprising:
      one or more processors of the optimization platform;
      a communication interface of the optimization platform and in communication with the interface platform; and
      non-transitory computer-readable memory storing executable instructions that, when executed by the one or more processors of the optimization platform, cause the optimization platform to:
         receive, via the interface platform, the measured surface temperature data;
         analyze the measured surface temperature data for completeness by identifying gaps in the measured surface temperature data based on a measurement interval;
         correct the measured surface temperature data for overall mass balance closure;
         generate reconciled surface temperature data;
         use the measured surface temperature data to determine whether an upset occurred;
         determine a model fitting parameter for a process model for the chemical plant based on the reconciled surface temperature data;
         adjust a cut point of the chemical plant or a tray efficiency of the chemical plant to minimize differences between measured performance of the chemical plant and predicted performance of the chemical plant;
         optimize the process model using the model fitting parameter for the process model for the chemical plant;
         determine a maximum capacity of the furnace based on the measured surface temperature data for the one or more tubes inside the furnace; and
   use a design of a device of the chemical plant to calculate a fraction of an available capacity of the device of the chemical plant that is currently being used; an analysis platform comprising:
      one or more processors of the analysis platform;
      a communication interface of the analysis platform and in communication with the interface platform; and
      non-transitory computer-readable memory storing executable instructions that, when executed by the one or more processors of the analysis platform, cause the analysis platform to:
         receive historical performance data for the chemical plant;
         establish relationships between operational parameters related to a process of the chemical plant;
         analyze the historical performance data for the chemical plant as trends over time to identify key indicators of process problems for the process of the chemical plant;
         determine target operational parameters of a final product of the chemical plant based on the historical performance data for the chemical plant; and
         predict a limit of the process of the chemical plant based on the target operational parameters of the final product of the chemical plant; and
   an interaction platform comprising:
      one or more processors of the interaction platform;
      a communication interface of the interaction platform and in communication with the interface platform; and
      non-transitory computer-readable memory storing executable instructions that, when executed by the one or more processors of the interaction platform, cause the interaction platform to:
         generate, for interactive display to a plant operator of the chemical plant, one or more detail screens relating the reconciled surface temperature data to operational performance of the one or more tubes inside the furnace;
         send a report showing actual performance of the chemical plant compared to predicted performance of the chemical plant;
         provide, to the plant operator of the chemical plant, alternatives for improving or modifying future operations of the chemical plant, the alternatives comprising operational changes and revamp modifications to generate improved performance of the chemical plant; and
         recommend, to the plant operator of the chemical plant, the target operational parameters of the final product of the chemical plant.

2. The system of claim 1, comprising:
   a prediction platform comprising:
      one or more processors of the prediction platform;
      a communication interface of the prediction platform and in communication with the interface platform; and
      non-transitory computer-readable memory storing executable instructions that, when executed by the one or more processors of the prediction platform, cause the prediction platform to:
         use a partial least squares (PLS) analysis or an orthogonal PLS (OPLS) analysis to generate a trustworthiness score of the process model for the chemical plant based on a comparison between the operational parameters related to the process of the chemical plant.

3. The system of claim 2, wherein the non-transitory computer-readable memory of the prediction platform stores further executable instructions that, when executed by the one or more processors of the prediction platform, cause the prediction platform to:

create a scoring model that is used for generating the trustworthiness score of the process model.

4. The system of claim 3, wherein the non-transitory computer-readable memory of the prediction platform stores further executable instructions that, when executed by the one or more processors of the prediction platform, cause the prediction platform to:

weight the trustworthiness score using one or more factors and based on a difference between the operational parameters related to the process of the chemical plant and corresponding one or more threshold values, wherein the one or more factors comprise an accuracy of a primary measuring sensor or an age of a measurement.

5. The system of claim 4, wherein the non-transitory computer-readable memory of the prediction platform stores further executable instructions that, when executed by the one or more processors of the prediction platform, cause the prediction platform to:

update the scoring model with the weighted trustworthiness score; and adjust the process model for the chemical plant based on the scoring model.

6. The system of claim 1, comprising:

a reconciliation platform comprising:
  one or more processors of the reconciliation platform;
  a communication interface of the reconciliation platform and in communication with the interface platform; and
  non-transitory computer-readable memory storing executable instructions that, when executed by the one or more processors of the reconciliation platform, cause the reconciliation platform to:
    receive the measured surface temperature data for the one or more tubes inside the furnace; and
    perform a heuristic analysis against the measured surface temperature data and performance process model results from the process model.

7. The system of claim 1, wherein the non-transitory computer-readable memory of the optimization platform stores further executable instructions that, when executed by the one or more processors of the optimization platform, cause the optimization platform to:

use a design of a fractionation column internal device of the chemical plant to calculate a fraction that is currently being used of available column capacity of the chemical plant.

8. The system of claim 7, wherein the non-transitory computer-readable memory of the optimization platform stores further executable instructions that, when executed by the one or more processors of the optimization platform, cause the optimization platform to:

use a tray size, a number of holes, a downcomer dimension, or a weir height of the design of the fractionation column internal device of the chemical plant to calculate the fraction that is currently being used of the available column capacity of the chemical plant.

9. The system of claim 1, wherein the non-transitory computer-readable memory of the optimization platform stores further executable instructions that, when executed by the one or more processors of the optimization platform, cause the optimization platform to:

use a vapor flow rate or liquid flow rate of the chemical plant to calculate a fraction that is currently being used of available column capacity of the chemical plant.

10. The system of claim 1, wherein the non-transitory computer-readable memory of the optimization platform stores further executable instructions that, when executed by the one or more processors of the optimization platform, cause the optimization platform to:

calculate, using emissivity of the one or more tubes inside the furnace and at least one geometrical factor of the one or more tubes inside the furnace, an estimated maximum tube wall temperature of the one or more tubes inside the furnace.

11. One or more non-transitory computer-readable media storing executable instructions that, when executed by one or more processors, cause a system to:

receive, from one or more thermocouples affixed to one or more tubes inside a furnace of a chemical plant, measured surface temperature data for the one or more tubes inside the furnace;

provide the measured surface temperature data to a database configured to store the measured surface temperature data;

analyze the measured surface temperature data for completeness by identifying gaps in the measured surface temperature data based on a measurement interval;

correct the measured surface temperature data for overall mass balance closure;

generate reconciled surface temperature data;

use the measured surface temperature data to determine whether an upset occurred;

determine a model fitting parameter for a process model for the chemical plant based on the reconciled surface temperature data;

adjust a cut point of the chemical plant or a tray efficiency of the chemical plant to minimize differences between measured performance of the chemical plant and predicted performance of the chemical plant;

optimize the process model using the model fitting parameter for the process model for the chemical plant;

determine a maximum capacity of the furnace based on the measured surface temperature data for the one or more tubes inside the furnace;

use a design of a device of the chemical plant to calculate a fraction of an available capacity of the device of the chemical plant that is currently being used;

generate, for interactive display, one or more detail screens relating the reconciled surface temperature data to operational performance of the one or more tubes inside the furnace;

send a report showing actual performance of the chemical plant compared to predicted performance of the chemical plant;

provide alternatives for improving or modifying future operations of the chemical plant, the alternatives comprising operational changes and revamp modifications to generate improved performance of the chemical plant; and recommend target operational parameters of a final product of the chemical plant based on historical performance data for the chemical plant.

12. The one or more non-transitory computer readable media of claim 11, wherein the executable instructions, when executed by the one or more processors, cause the system to:

use a partial least squares (PLS) analysis to generate a trustworthiness score of the process model for the chemical plant based on a comparison between operational parameters related to a process of the chemical plant.

13. The one or more non-transitory computer readable media of claim 12, wherein the executable instructions, when executed by the one or more processors, cause the system to:
create a scoring model that is used for generating the trustworthiness score of the process model.

14. The one or more non-transitory computer readable media of claim 13, wherein the executable instructions, when executed by the one or more processors, cause the system to:
weight the trustworthiness score using one or more factors and based on a difference between the operational parameters related to the process of the chemical plant and corresponding one or more threshold values, the one or more factors comprising an accuracy of a primary measuring sensor.

15. The one or more non-transitory computer readable media of claim 14, wherein the executable instructions, when executed by the one or more processors, cause the system to:
update the scoring model with the weighted trustworthiness score; and
adjust the process model for the chemical plant based on the scoring model.

16. The one or more non-transitory computer readable media of claim 11, wherein the executable instructions, when executed by the one or more processors, cause the system to:
perform a heuristic analysis against the measured surface temperature data and performance process model results from the process model.

17. A method for enhancing operational efficiency of a chemical plant, the method comprising:
receiving, by a computing device and from one or more thermocouples affixed to one or more tubes inside a furnace of a chemical plant, measured surface temperature data for the one or more tubes inside the furnace;
providing, by the computing device, the measured surface temperature data to a database configured to store the measured surface temperature data;
analyzing, by the computing device, the measured surface temperature data for completeness by identifying gaps in the measured surface temperature data based on a measurement interval;
correcting, by the computing device, the measured surface temperature data for overall mass balance closure;
generating, by the computing device, reconciled surface temperature data;
using, by the computing device, the measured surface temperature data to determine whether an upset occurred;
determining, by the computing device, a model fitting parameter for a process model for the chemical plant based on the reconciled surface temperature data;
adjusting, by the computing device, a cut point of the chemical plant or a tray efficiency of the chemical plant to minimize differences between measured performance of the chemical plant and predicted performance of the chemical plant;
optimizing, by the computing device, the process model using the model fitting parameter for the process model for the chemical plant;
determining, by the computing device, a maximum capacity of the furnace based on the measured surface temperature data for the one or more tubes inside the furnace;
using, by the computing device, a design of a device of the chemical plant to calculate a fraction of an available capacity of the device of the chemical plant that is currently being used;
generating, by the computing device and for interactive display, one or more detail screens relating the reconciled surface temperature data to operational performance of the one or more tubes inside the furnace;
sending, by the computing device, a report showing actual performance of the chemical plant compared to predicted performance of the chemical plant;
providing, by the computing device, alternatives for improving or modifying future operations of the chemical plant, the alternatives comprising operational changes and revamp modifications to generate improved performance of the chemical plant; and
recommending, by the computing device, target operational parameters of a final product of the chemical plant.

18. The method of claim 17, comprising:
creating, by the computing device, a scoring model; and
using the scoring model to generate, by the computing device, a trustworthiness score of the process model for the chemical plant based on a comparison between operational parameters related to a process of the chemical plant.

19. The method of claim 18, comprising:
weighting, by the computing device, the trustworthiness score using one or more factors and based on a difference between the operational parameters related to the process of the chemical plant and corresponding one or more threshold values, the one or more factors comprising an age of a measurement;
updating, by the computing device, the scoring model with the weighted trustworthiness score; and
adjusting, by the computing device, the process model for the chemical plant based on the scoring model.

20. The method of claim 17, comprising:
performing, by the computing device, a heuristic analysis against the measured surface temperature data and performance process model results from the process model.

* * * * *